United States Patent
Roberds et al.

(10) Patent No.: US 9,236,942 B1
(45) Date of Patent: Jan. 12, 2016

(54) FREE SPACE FIBER-OPTIC CONNECTOR

(71) Applicant: L-3 Communications Corporation, New York, NY (US)

(72) Inventors: Brian Edward Roberds, San Marcos, CA (US); Timothy Clyde Collins, Carlsbad, CA (US); Jayant Kumar Gupta, Carlsbad, CA (US); Jaclyn Marie Nascimento, Oceanside, CA (US); Gregory Joseph Pietrangelo, Carlsbad, CA (US); Michael John Talmadge, San Marcos, CA (US); Nathan Verner Whittenton, Carlsbad, CA (US); Thomas Karl Berger, Winchester, CA (US); Christopher Ryan Collins, Carlsbad, CA (US); Tristan Dennis Jones, Carlsbad, CA (US)

(73) Assignee: L-3 Communications Corporation, New York, NY (US)

( * ) Notice: Subject to any disclaimer, the term of this patent is extended or adjusted under 35 U.S.C. 154(b) by 0 days.

(21) Appl. No.: 14/728,943

(22) Filed: Jun. 2, 2015

Related U.S. Application Data

(63) Continuation of application No. 14/491,865, filed on Sep. 19, 2014.

(51) Int. Cl.
*G02B 6/38* (2006.01)
*H04B 10/11* (2013.01)
(Continued)

(52) U.S. Cl.
CPC .......... *H04B 10/1143* (2013.01); *G02B 6/3816* (2013.01); *G02B 6/3886* (2013.01); *H04B 10/116* (2013.01); *G02B 6/3809* (2013.01); *H04B 13/02* (2013.01)

(58) Field of Classification Search
CPC . G02B 6/3886; G02B 6/3816; H04B 10/1143
See application file for complete search history.

(56) References Cited

U.S. PATENT DOCUMENTS

| 4,682,848 A | 7/1987 | Cairns et al. |
| 4,690,495 A | 9/1987 | Giannini |

(Continued)

FOREIGN PATENT DOCUMENTS

| CN | 201051162 Y | 4/2008 |
| CN | 102347796 A | 2/2012 |

(Continued)

OTHER PUBLICATIONS

Awan, Muhammad Saleem et al. "Characterization of Fog and Snow Attenuations for Free-Space Optical Propagation", *Journal of Communications*, vol. 4, No. 8, Sep. 2009, 13 pages.

(Continued)

*Primary Examiner* — Jerry Rahll
(74) *Attorney, Agent, or Firm* — Knobbe Martens Olson & Bear LLP

(57) ABSTRACT

This disclosure provides systems, methods and apparatus of establishing a free-space communication link through a medium. The medium can be an occluded environment with increased absorption and/or scattering effects. The free-space communication link includes a transmitter configured to transmit an optical signal at a wavelength suitable for transmission through the medium without suffering excessive optical losses due to absorption and/or scattering effects. The free-space communication link includes a receiver configured to receive the transmitted optical signal. The transmitter-receiver pair is configured to efficiently transmit optical signals at the suitable wavelength over a distance between about 1 mm and about 50 m. The transmitter and the receiver can be configured as portions of a fiber-optic connector assembly that can be used to connect two fiber-optic cables in an occluded environment.

30 Claims, 7 Drawing Sheets

(51) Int. Cl.
    *H04B 10/114*     (2013.01)
    *H04B 10/116*     (2013.01)
    *H04B 13/02*     (2006.01)

(56) References Cited

U.S. PATENT DOCUMENTS

| | | | |
|---|---|---|---|
| 5,229,593 A * | 7/1993 | Cato | H04B 10/1125 250/205 |
| 6,243,182 B1 | 6/2001 | Wang | |
| 6,868,237 B2 | 3/2005 | Willebrand et al. | |
| 7,446,871 B2 | 11/2008 | Plant | |
| 7,805,079 B1 | 9/2010 | Meyers et al. | |
| 7,945,168 B2 | 5/2011 | Meyers et al. | |
| 7,953,326 B2 | 5/2011 | Farr et al. | |
| 8,045,859 B2 | 10/2011 | Bandyopadhyay | |
| 8,155,527 B2 | 4/2012 | Rotgaizer | |
| 8,358,420 B1 | 1/2013 | DeWitt et al. | |
| 8,755,656 B2 | 6/2014 | Tan et al. | |
| 2002/0109887 A1 * | 8/2002 | Aburakawa | H04B 10/1125 398/121 |
| 2002/0171896 A1 | 11/2002 | Clark et al. | |
| 2004/0048623 A1 | 3/2004 | Flannery | |
| 2006/0224048 A1 | 10/2006 | Devaul et al. | |
| 2007/0034803 A1 | 2/2007 | Plant | |
| 2009/0202254 A1 | 8/2009 | Majumdar et al. | |
| 2009/0252499 A1 | 10/2009 | Rotgaizer | |
| 2012/0183258 A1 * | 7/2012 | Schwandt | G02B 6/3886 385/57 |
| 2012/0288282 A1 | 11/2012 | Väänänen | |
| 2013/0143744 A1 | 6/2013 | Marsili et al. | |
| 2013/0187051 A1 | 7/2013 | McCaughan et al. | |

FOREIGN PATENT DOCUMENTS

CN     202256779 U     5/2012
JP     4117155 B2     7/2008

OTHER PUBLICATIONS

Hanson, Frank and Radic, Stojan, "High bandwidth underwater optical communication", *Applied Optics*, vol. 47, No. 2, Jan. 10, 2008, 7 pages.

Bloom, Scott et al. "Understanding the performance of free-space optics[Invited]", *Journal of Optical Networking*, vol. 2, No. 6, Jun. 2003, 23 pages.

"asharanick," Introduction to Underwater Optical Communication (Feb. 16, 2011), http://www.slideshare.net/asharanick/under-water-communication-ppt (last visited Jun. 2, 2015).

* cited by examiner

FREE SPACE FIBER-OPTIC CONNECTOR

CROSS-REFERENCE TO RELATED APPLICATIONS

The present application is a continuation of U.S. patent application Ser. No. 14/491,865, filed Sep. 19, 2014, and entitled "FREE SPACE FIBER-OPTIC CONNECTOR." The contents of this prior application are considered part of the present application, and are hereby incorporated by reference in their entirety.

TECHNICAL FIELD

The present application generally relates to systems and methods of free space optical communication and, in particular, to connecting fiber-optic cables using a free-space optical communication link.

DESCRIPTION OF THE RELATED TECHNOLOGY

The growth in social networking, e-commerce, cloud computing, data streaming, etc. is causing an explosive growth in global data traffic. Handling this growth requires high capacity networks that can carry a large amount of data traffic over large distances. Fiber-optic communication systems can operate at data rates beyond 1.0 Gbits/s, for example 2.5 Gbits/s, 10 Gbits/s, 20 Gbits/s, 40 Gbits/s, 100 Gbits/s, 128 Gbits/s, and 256 Gbits/s and are thus capable of handling the explosive growth in data rate. Since optical fibers can advantageously carry higher bandwidth data over distances spanning hundreds of kilometers, they are used in access networks, metro networks as well as long distance terrestrial and submarine networks.

Optical fiber connectors are used to join optical fibers where a connect/disconnect capability is required. Optical fiber connectors include a ferrule disposed in a connector body. Optical fibers are connectorized by inserting a bare optical fiber into the ferrule, attaching the optical fiber to the ferrule (e.g., by crimping or by applying epoxy) and preparing the end-face of the connectorized optical fiber by cleaving and polishing the fiber end to have a smooth surface that is free of scratches and/or defects. Most optical fiber connectors are spring-loaded, so that the end-face of the optical fibers is pressed together when the connectors are mated. Before connecting connectorized optical fibers, the end-face of each of the optical fibers is cleaned to be free of dust, dirt, oils or other impurities and is inspected to ensure that the end-face is free of scratches. Ensuring that the end-faces are clean and scratch free ensures that the optical connection has a low insertion loss and reduced reflection and/or scattering at the interface resulting in a high return loss.

A variety of optical fiber connectors are available such as FC, LC, SC, ST, FDDI, etc. The various optical fiber connectors can be used to connect single optical fibers or a plurality of optical fibers. The main differences among different types of connectors are dimensions and methods of mechanical coupling. Different connectors can be selected for different equipment based on manufacturer's recommendations.

SUMMARY

The systems, methods and devices of this disclosure each have several innovative aspects, no single one of which is solely responsible for the desirable attributes disclosed herein.

Various embodiments described herein comprise an optical connector assembly including components that establish a free space optical communication link between a plurality of fiber-optic cables to transmit data between the plurality of fiber-optic cables. The components in the optical connector assembly can be configured to condition the optical data signal (e.g., by amplifying, regenerating and/or retiming the optical data signal) before transmitting the optical data signal over the free space communication link. Embodiments of the optical connector assembly described herein can be configured to establish unidirectional or bidirectional free space communication links between the plurality of fiber-optic cables. Various embodiments of the optical connector assembly described herein can utilize wavelength division multiplexing (WDM) and/or time division multiplexing (TDM) technology to provide full duplex communication link to enable simultaneous bi-directional communication between the plurality of fiber-optic cables.

In various embodiments, components of the connector assembly can be housed in metal or plastic casings that can be physically connected to each other. The casings can protect the components of the connector assembly. The casings could also block incoming light which may interfere with the signals transmitted over the free space communication link and prevent leakage of the optical signals transmitted over the free space link. In various embodiments, the casings can include magnets to achieve physical connection between the two optical fibers.

Various implementations of the optical fiber connector assembly described herein can be used to connect two fiber-optic cables without requiring the end-faces of the two fiber-optic cables to physically touch each other. Accordingly, the implementations of the connector assemblies described herein are less sensitive to the environment and/or cleanliness of the end-faces and can be used in obstructed and/or occluded environments. Furthermore, since the optical end-faces of the optical fibers do not contact each other, they experience less wear and tear and thus can have a greater lifetime and can withstand a larger number of connections and disconnection as compared to traditional connector assemblies.

The various embodiments of the optical fiber connector assembly including a free-space communication link also have a higher tolerance to misalignment between the faces of the fiber-optic cables as compared to traditional connector assemblies, since the light beams employed in the free-space communication link between the two optical fibers can have a large spot size. Additionally, the free-space link between the two fiber-optic cables can be established by selecting a wavelength that is efficiently transmitted through the medium. For example, if the optical fiber connector assembly including a free-space communication link is used to connect to fiber-optic cables underwater, then the free-space link between the two fiber-optic cables can be established by selecting a wavelength in the range between about 400 nm and about 3 microns which is least absorbed by water and thus most efficiently transmitted through water.

The embodiments of the optical fiber connector assembly including a free-space communication link as described here are also configured to recondition the optical signal before transmitting over the free space communication link. This can advantageously improve the optical link budget and overall fidelity of the fiber-optic link.

One innovative aspect of the subject matter described in this disclosure can be implemented in a fiber-optic connector assembly comprising a first connecting portion and a second connecting portion. The first connecting portion comprises a fiber-optic receiver configured to receive an optical signal from an input optical fiber at a fiber communication wavelength between about 1300 nm and about 1650 nm. The first connecting portion further comprises a free-space optical transmitter configured to transmit a free-space optical signal at a free-space communication wavelength between about 360 nm and about 3 microns through a free space medium. The free-space optical signal is modulated with data recovered from the received optical signal. The second connecting portion comprises a free-space optical receiver configured to receive at least a portion of the free-space optical signal transmitted from the free-space optical transmitter. The second connecting portion further comprises a fiber-optic transmitter configured to transmit a fiber-optic signal at a fiber communication wavelength between about 1300 nm and about 1650 nm through an output optical fiber. The fiber-optic signal is modulated with data recovered from the portion of the free-space optical signal received at the free-space optical receiver. The first and second connecting portions are configured to be physically connected to each other such that when connected, the free-space optical transmitter of the first connecting portion is spaced apart from the free-space optical receiver of the second connecting portion by a distance in the free space medium.

In various implementations, the distance between the free-space optical transmitter and the free-space optical receiver can be between about 0.01 mm and about 1 m. The first connecting portion can comprise a first signal conditioner connected to the output fiber-optic receiver and the input of free-space optical transmitter. In various implementations, the signal conditioner can include a repeater. The signal conditioner is configured to condition a signal at the output of the fiber-optic receiver. For example, the signal conditioner can condition the signal at the output of the fiber-optic receiver by amplifying, regenerating and/or retiming the signal at the output of the fiber-optic receiver.

In various implementations, the second connecting portion can comprise a signal conditioner connected at the output of the free-space optical receiver and the input of the fiber-optic transmitter. The signal conditioner in the second connecting portion can condition a signal at the output of the free-space optical receiver. For example, the signal conditioner in the second connecting portion can condition the signal at the output of the free-space optical receiver by amplifying, regenerating and/or retiming the signal at the output of the free-space optical receiver.

In various implementations, the fiber-optic connector assembly can be used to connect pairs of fiber-optic cables disposed in an occluded medium. In such implementations, the space between the free-space optical transmitter of the first connecting portion and the free-space optical receiver of the second connecting portion can include at least one of water, smoke, fog, ice, gas, oil, smoke or dust. In various implementations, the free-space medium can comprise a liquid having turbidity between about 5 NTU and about 5000 NTU. The first and the second connecting portions can be configured such that when physically connected a portion of the free-space medium can be present between the free-space optical transmitter and the free-space optical receiver.

The components of the first and the second connecting portions can be housed in metal or plastic casing. In various implementations, the casing can include a magnet. The casing can substantially shield the free-space optical receiver from ambient light emanating sources other than the free-space optical transmitter. In various implementations, portions of the casings can be coated by an anti-biologic material.

In various implementations, the fiber-optic connector assembly can be configured to provide bi-directional communication. In such implementations, the first connecting portion includes a free-space optical receiver configured to receive an optical signal over the free space medium at a free-space wavelength between about 360 nm and about 3 microns; and a fiber-optic transmitter configured to transmit the received signal at a fiber communication wavelength between about 1300 nm and about 1650 nm through an output optical fiber. In such implementations, the second connecting portion comprises a fiber-optic receiver configured to receive an optical signal from an input optical fiber at a fiber communication wavelength between about 1300 nm and about 1650 nm; and a free-space optical transmitter configured to transmit the conditioned signal at a free-space communication wavelength between about 360 nm and about 3 microns through the free space medium.

Another innovative aspect of the subject matter described in this disclosure can be implemented in an optical communication system comprising a first free-space optical transmitter and a first free-space optical receiver coupled to the first free-space optical transmitter. The first free-space optical receiver is spaced apart from the first free-space optical transmitter by a distance less than or equal to about 50 cm in a free space medium. The first free-space optical transmitter is configured to transmit a first beam of light at a first free-space communication wavelength between about 360 nm and about 3 microns through the free space medium. The first free-space optical transmitter comprises an optical source and a collimating lens configured to collimate light output from the optical source and emit a first free-space optical signal. The first free-space optical receiver is configured to receive at least a portion of the first free-space optical signal. The first free-space optical receiver comprises an optical detector and a focusing lens having an optical axis and a focal length. The optical detector is positioned at a distance less than or greater than the focal length of the focusing lens such that the received portion of the free-space optical signal is defocused at the receiver. In various implementations, the first beam of light is incident on the focusing lens along a direction that is at an angle between about ±30 degrees with respect to the optical axis in a plane orthogonal to a plane including the optical axis.

The optical communication system can further comprise a second free-space optical transmitter configured to transmit a second free-space optical signal at a second free-space communication wavelength between about 360 nm and about 3 microns through the free space medium; and a second free-space optical receiver optically coupled to the second free-space optical transmitter and spaced apart from the second free-space optical transmitter by a distance less than or equal to about 50 cm in the free space medium. The second free-space optical receiver is configured to receive at least a portion of the second free-space optical signal. In various implementations, the first and the second free-space optical signals can be modulated with data having a data rate less than or equal to about 10 Gb/s.

The optical communication system described above can be included in a fiber-optic connector assembly comprising a first connecting portion and a second connecting portion. In various implementations, the first connecting portion of the fiber-optic connector assembly can include the first and the second free-space optical transmitter while the second connecting portion includes the first and the second free-space optical receiver. In some implementations, the first connecting portion can include the first free-space optical transmitter and the second free-space optical receiver while the second connecting portion can include the first free-space optical receiver and the second free-space optical transmitter. The fiber-optic connector assembly can be used to connect a pair of fiber-optic cables in an occluded medium. In such implementations, the free-space medium between the first and the second connecting portion can include water, gas, smoke, oil, ice, fog, a liquid having turbidity between about 5 NTU and about 5000 NTU, etc.

Yet another innovative aspect of the subject matter described in this disclosure can be implemented in an optical communication system comprising a first transceiver and a second transceiver is spaced apart from the first transceiver by a distance in a free-space medium. In various implementations, the free-space medium can be occluded. For example, the free-space medium can include a liquid having turbidity between about 5 NTU and about 5000 NTU. The second transceiver is configured to receive signals transmitted from the first transceiver and transmit signals to first transceiver. The first transceiver comprises a first free-space optical receiver configured to receive optical signals at a first wavelength $\lambda 1$ and a first plurality of free-space optical transmitters configured to transmit optical signals at a second wavelength $\lambda 2$. The second transceiver comprises a second free-space optical receiver configured to receive optical signals transmitted from the first plurality of free-space optical transmitters at the second wavelength $\lambda 2$ and a second plurality of free-space optical transmitters configured to transmit optical signals at the first wavelength $\lambda 1$ to the first free-space optical receiver.

In various implementations, the first free-space optical receiver can be disposed about a first longitudinal axis of the first transceiver and the first plurality of free-space optical transmitters can be disposed around the first free-space optical receiver. In various implementations, the first transceiver can be rotationally symmetric about the first longitudinal axis.

In various implementations, the second free-space optical receiver can be disposed about a second longitudinal axis of the second transceiver and the second plurality of free-space optical transmitters can be disposed around the second free-space optical receiver. In various implementations, the second transceiver can be rotationally symmetric about the second longitudinal axis.

The first and the second transceivers can be included in a fiber-optic connector assembly comprising a first connecting portion and a second connecting portion. In various implementations, the first connecting portion of the fiber-optic connector assembly can include the first transceiver and the second connecting portion can include the second transceiver. The first connecting portion can be attached to a first fiber-optic cable and the second connecting portion can be attached to a second fiber-optic cable and the first and the second fiber-optic cables can be connected by bringing the first and the second connecting portions within a distance of each other. In various implementations, the first and the second connecting portions can be connected in any orientation. For example, the first and the second connecting portions can be rotated while making the connection or when connected.

Another innovative aspect of the subject matter described in this disclosure can be implemented in a method of connecting a first connecting portion and a second connecting portion of a fiber-optic connector assembly. The method comprises bringing the first connecting portion within a distance of the second connecting portion such that the first connecting portion is self-guided under the influence of an attractive force towards the second connecting portion. Under the influence of the attractive force the first and the second connection portions physically contact each other such that an optical transmitter disposed in the first connecting portion or the second connecting portion is spaced apart from an optical receiver disposed in the second connecting portion or the first connecting portion by a space including a medium. In various implementations, the medium can be occluded. For example, the medium can include water, oil, gas, smoke, fog, ice, liquid with turbidity between 5 NTU and 5000 NTU, etc.

In various implementations, the first connecting portion is brought within a distance of the second connecting portion by an automated device such as, a remotely operated vehicle, a robotic arm, etc. Accordingly, various implementations of this method of connection can be accomplished without human intervention. Alternately, in some implementations, the first and the second connecting portions can be connected using human intervention.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 1B-2 is a cross-section view of the implementation of the fiber-optic connector assembly taken along lines 150a-150b of FIG. 1B-1.

Like reference numbers and designations in the various drawings indicate like elements.

DETAILED DESCRIPTION

Figure 1A:
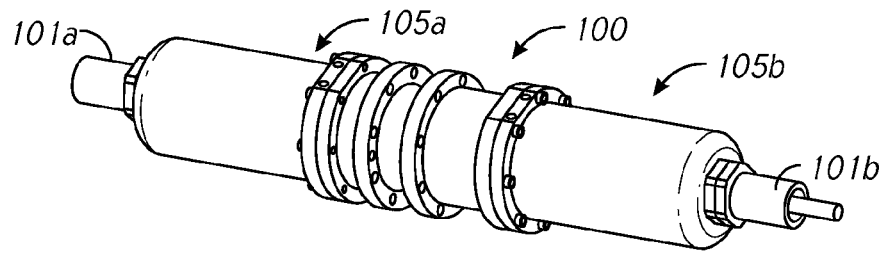
FIG. 1A is a perspective view of a fiber-optic connector assembly, including a free-space optical communication link in the connected mode.

The following detailed description is directed to certain implementations for the purposes of describing the innovative aspects. However, the teachings herein can be applied in a multitude of different ways. As will be apparent from the following description, the innovative aspects may be implemented in a fiber-optic communication system. More particularly, it is contemplated that the innovative aspects may be implemented in or associated with connector assemblies that are used to connect fiber-optic cables. Various implementations of the systems and methods described herein can be used to establish a free-space optical communication link across a medium including air, water, oil, gas, smoke, dust, particulates, etc. Various implementations of the systems and methods described herein include connector assemblies that are used to connect optical fibers in various places such as, for example, underwater (e.g., in sea water, in muddy water, in icy water, in sandy water), smoke-filled areas (e.g., in oil refineries, coal mines, etc.), natural gas environment, areas that are difficult or impossible to access (e.g., tight spaces between walls, ceilings or floors in residential or commercial structures, tunnels, underground places), or other places where the environment is occluded by dirt, gas, oil, water, smoke, particulates or other materials. Other uses are also possible and are within the scope of this disclosure.

Optical communication may occur within environments including underwater, in smoke-filled areas, around natural gas environments, and other places where the medium (be it gas or liquid) is not clear, or is occluded. In such environments it may not be possible to use traditional fiber-optic connectors that are configured to connect two fiber-optic cables by bringing the end-faces of the two fiber-optic cables in contact with each other and keeping them in contact with each other via a latching force, such as a latching force provided by a spring. Furthermore, it may not be possible to use traditional fiber-optic connectors in occluded environments, since traditional fiber-optic connectors are sensitive to (i) the environment, (ii) cleanliness of the end-faces of the fiber-optic cables and (iii) the alignment between the end-faces of the fiber-optic cables. For example, the fiber-optic link including the two fiber-optic cables connected using traditional connector assemblies can experience an increased optical loss if the end-faces of the connected optical fibers are dirty or become misaligned (e.g., due to a change in the latching force). The increased optical loss could reduce the optical link budget and/or degrade the communication channel.

A common method of connecting two fiber-optic cables using traditional connector assemblies includes cleaning the end-faces of the fiber-optic cables prior to making the connection. As discussed above, cleaning the end-faces of the fiber-optic cable can reduce insertion loss. However, it may be difficult to clean the end-faces of the fiber-optic cables prior to making the connection in places such as, for example, underwater (e.g., in sea water, in muddy water, in icy water, in sandy water), smoke-filled areas (e.g., in oil refineries, coal mines, etc.), natural gas environment, areas that are difficult or impossible to access (e.g., tight spaces between walls, ceilings or floors in residential or commercial structures, tunnels, underground places), or other places where the environment is occluded by dirt, gas, oil, water, smoke, particulates or other materials. Accordingly, there is a need for novel connector assemblies and methods that can be used to connect one or more pairs of fiber-optic cables in places such as, for example, underwater (e.g., in sea water, in muddy water, in icy water, in sandy water), smoke-filled areas (e.g., in oil refineries, coal mines, etc.), natural gas environment, areas that are difficult or impossible to access (e.g., tight spaces between walls, ceilings or floors in residential or commercial structures, tunnels, underground places), or other places where the environment is occluded by dirt, gas, oil, water, smoke, particulates or other materials.

Various implementations described herein include a unidirectional and/or a bidirectional free space optical communication link comprising a transmitter system that is configured to transmit data at one or more free-space wavelengths through a free space medium to a receiver system. The free space medium can include air, water (e.g., salt water, sandy water, icy water, muddy water, etc.), smoke, oil, dust, gas (e.g., natural gas, methane, etc.), particulates, etc. In various implementations, the free space medium can be occluded (or not clear). The one or more free-space wavelengths are selected based on their transmission efficiency through the medium. For example, in various implementations, the one or more free-space wavelengths can have lower absorption coefficient and/or lower scattering coefficient as compared to other wavelengths. The unidirectional and/or a bidirectional free space optical communication link is configured to transmit a signal through the free space medium over a distance that ranges between about 0.001 mm and about 1 m (e.g., between about 0.001 mm and about 0.01 mm, between about 0.01 mm and about 0.1 mm, between about 0.1 mm and about 1.0 mm, between about 1 mm to about 1 cm, between about 1 cm to about 10 cm, between about 10 cm and about 50 cm, between about 50 cm and about 1 m or there between) depending on characteristics of the free space medium including but not limited to turbidity, particle density and attenuation.

Various implementations described herein include an optical fiber connector assembly including one or more unidirectional and/or bidirectional free space optical communication links that are configured to transmit data at one or more communication wavelengths through the free space medium. The optical fiber connector assembly comprises a first connecting portion including the transmitter system of the one or more unidirectional and/or bidirectional free space optical communication links and a second connecting portion including the receiver system one or more unidirectional and/or bidirectional free space optical communication links. The first connecting portion can be attached to a first fiber-optic cable and the second connecting portion can be attached to a second fiber-optic cable. The first and the second connecting portions can be configured to be physically connected to each other such that when the first and the second connecting portions are connected, the end-face of the first fiber-optic cable is spaced apart from the end-face of the second fiber-optic cable by the free-space medium. In various implementations, the end-face of the first fiber-optic cable is separated from the end-face of the second fiber-optic cable by a distance between about 1 mm and about 50 cm from the end-face of the second fiber-optic cable. Since, the end-faces of the two fiber-optic cables are configured to not touch each other; the fiber-optic cables are subject to less wear and tear and thus can survive a greater number of mating cycles (i.e. the number of times the fiber-optic cables are connected, disconnected and reconnected) as compared to fiber-optic cables provided with traditional connector assemblies. Furthermore, since, the end-faces of the two fiber-optic cables are configured to not touch each other, the connection is less sensitive to dirt and dust on the end-faces. Accordingly, these connector assemblies can be used to connect fiber-optic cables in occluded environments including air, water, smoke, gas, oil, particulates, sandy water, muddy water, etc.

FIG. 1A illustrates an implementation of a fiber-optic connector assembly 100 including a free-space optical communication link in the connected mode. The fiber-optic connector assembly 100 is used to connect two fiber-optic cables 101a and 101b. The fiber-optic cables 101a and 101b can include multimode fiber (MMF), single mode fiber (SMF), dispersion shifted fiber (DSF), polarization maintaining fiber (PMF) or any other optical fiber that is used in optical communication systems and networks. The fiber-optic cables 101a and 101b can be configured to transmit optical signals in a variety of data formats (e.g., Gigabit Ethernet, OC-768, and/or a variety of data rates (e.g., less than or equal to about 100 Mb/s, between about 1 Mb/s-about 100 Mb/s, between about 100 Mb/s-1 Gb/s, between about 1 Gb/s-10 Gb/s, between about 10 Gb/s-40 Gb/s or greater than or equal to 40 Gb/s). For example, in some implementations, the fiber-optic cable 101a can be optically coupled to a first Gigabit Ethernet (GigE) transmitter/receiver and the fiber-optic cable 101b can be optically coupled to a second Gigabit Ethernet (GigE) transmitter/receiver. Accordingly, in such implementations, the fiber-optic cables 101a and 101b can transmit Gigabit Ethernet signals. Without any loss of generality, the fiber-optic cables 101a and 101b and the components included in the connector assembly 100 are independent of the data format and thus can be used to transmit data signals in any format. The fiber-optic cables 101a and 101b and the components included in the connector assembly 100 are not limited for use in digital optical communication systems and networks but can also be used in analog optical communication systems and networks.

Figures 1, 1B:
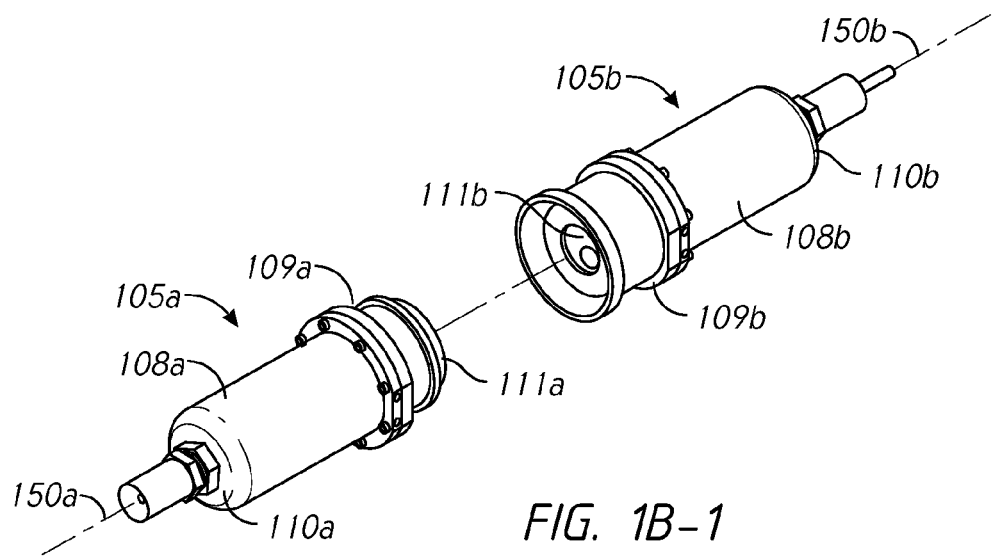
FIG. 1B-1 is a perspective view of the implementation of the fiber-optic connector assembly illustrated in FIG. 1A in the un-connected mode.
Figures 1, 1B, 2:
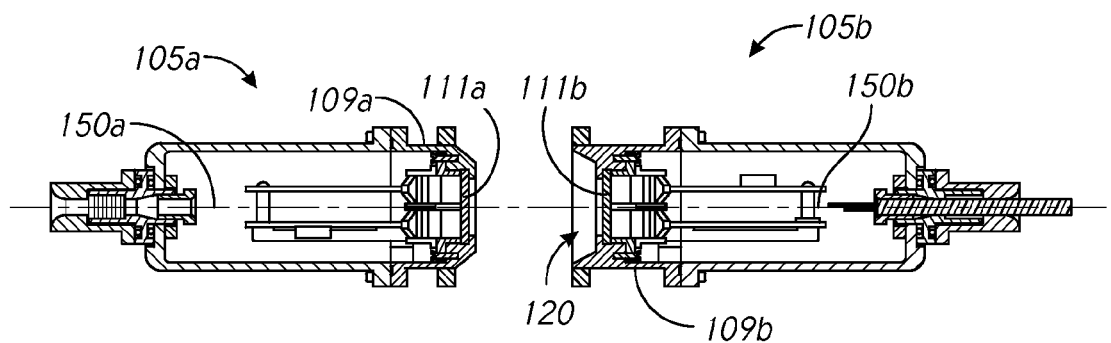

The fiber-optic connector assembly 100 includes a first connecting portion 105a and a second connecting portion 105b. FIG. 1B-1 is a perspective view of the implementation of the fiber-optic connector assembly 100 illustrated in FIG. 1A in the unconnected mode. FIG. 1B-2 is a cross-section view of the implementation of the fiber-optic connector assembly 100 along the lines 150a-150b of FIG. 1B-1. The optical components in the first connecting portion 105a are housed in metal or plastic casing 108a and the optical components in the second connecting portion 105b are housed in metal or plastic casing 108b. The casing 108a includes an opening 110a configured to receive the fiber-optic cable 101a and the casing 108b includes an opening 110b configured to receive the fiber-optic cable 101b. Without any loss of generality, the sides of the casings 108a and 108b adjacent the openings 110a and 110b can be referred to as the fiber ends.

The casing 108a has an optical window 111a and the casing 108b has an optical window 111b. The optical windows 111a and 111b are disposed on a side opposite the fiber ends 110a and 110b. Without any loss of generality, the optical windows 111a and 111b can be referred to as the end-faces of the fiber-optic cables 101a and 101b respectively. The first connecting portion 105a and the second connecting portion 105b each has a longitudinal axis 150a and 150b passing through the openings 110a and 110b, respectively and intersecting the end-faces 111a and 111b, respectively. In various implementations, the first and second connecting portions 105a and 105b can be symmetric about the longitudinal axis 150a and 150b.

The first connecting portion 105a has a tip 109a that is disposed around the end-face 111a and extending outward from the end-face 111a. The second connecting portion 105b has a tip 109b disposed around the end-face 111b and that extends outward from the end-face 111b. The tip 109b is sized and shaped to mate with the tip 109a and to thereby form a light-tight connection. In various implementations, the tip 109a has a protruding member and can thus be referred to as a male connecting portion. In such implementations, the tip 109b has a recess 120, as shown in FIG. 1B-2 that is sized and shaped to accommodate the protruding member.

The components in the first connecting portion 105a and the second connecting portion 105b are configured such that when the portions 105a and 105b are connected, the external surfaces of the first connecting portion 105a and the second connecting portion 105b (e.g., the tips 109a and 109b) physically contact each other, while the end-faces 111a and 111b are spaced apart from each other in a free-space medium by a distance. The components included in the first and second connecting portions 105a and 105b can be used to establish a unidirectional or a bidirectional free space optical communication link between the fiber-optic cables 101a and 101b in the free-space optical medium. In various implementations, the distance between the end-faces 111a and 111b can vary between about 1 mm and about 1 m. For example, the distance between the end-faces 111a and 111b can be between about 1 mm to about 1 cm, 1 cm to about 10 cm, between about 10 cm and about 50 cm, between about 50 cm and about 1 m or there between. In various implementations, depending on the characteristics of the free-space medium and parameters of the optical signal, the distance between the end-faces 111a and 111b can exceed 1 m. For example, in various implementations, the distance between the end-faces 111a and 111b can be greater than or equal to 1 m and less than or equal to 50 m, greater than or equal to 10 m and less than or equal to 40 m, greater than or equal to 20 m and less than or equal to 40 m, or there between.

As discussed above, the fiber-optic connector assembly 100 can be used to connect fiber-optic cables 101a and 101b disposed in an occluded environment and/or underwater. For example, the fiber-optic connector assembly 100 can be advantageously used to connect the fiber-optic cables 101a and 101b even when deployed in places such as, for example, underwater (e.g., in sea water, in muddy water, in icy water, in sandy water), smoke-filled areas (e.g., in oil refineries, coal mines, etc.), natural gas environment, areas that are difficult or impossible to access (e.g., tight spaces between walls, ceilings or floors in residential or commercial structures, tunnels, underground places), or other places where the environment is occluded by dirt, gas, oil, water, smoke, particulates or other materials. Various implementations of the fiber-optic connector assembly 100 described herein as well as existing fiber-optic connector assemblies can be used to connect the fiber-optic cables 101a and 101b in a liquid environment having a turbidity between about 1 nephelometric turbidity units (NTU) and about 5 NTU. While it may not be possible to use existing fiber-optic connector assemblies to connect fiber-optic connectors in a liquid environment having a turbidity greater than 5 NTU, implementations of the fiber-optic connector assembly 100 described herein can be used to connect the fiber-optic cables 101a and 101b deployed in a liquid environment having a turbidity greater than or equal to 5 NTU (for example, turbidity between about 5 NTU and 5000 NTU, or values there between).

In various implementations, the fiber-optic connector assembly 100 can be used to connect the fiber-optic cables 101a and 101b deployed in hazy environments comprising particles with diameter less than or equal to 2.5 microns, less than or equal to 10 microns, less than or equal to 100 microns or less than or equal to 1000 microns. The fiber-optic connector assembly 100 can be configured to be used even when the particulate density in the hazy environment exceeds 50 $\mu g/m^3$, such as for example, greater than or equal to 50 $\mu g/m^3$ and less than or equal to 100,000 $\mu g/m^3$, greater than or equal to 100 $\mu g/m^3$ and less than or equal to 10,000 $\mu g/m^3$, greater than or equal to 1000 $\mu g/m^3$ and less than or equal to 5000 $\mu g/m^3$, or values there between.

The distance in the free-space medium between the end-faces 111a and 111b when the connecting portions 105a and 105b are physically contacting each other can depend on the turbidity and/or the particulate density of the free-space medium. For example, the end-faces 111a and 111b can be separated by a distance between about 0.001 mm and about 1 cm in water having a turbidity less than or equal to 5000 NTU. As discussed above, the distance between the connecting portions 105a and 105b depends on the characteristics of the free-space medium including but not limited to turbidity, attenuation, particulate density, etc. Thus, based on the characteristic of the free-space medium, the end-faces 111a and 111b can be separated by a distance between about 1 cm and about 1 m in different implementations. In various implementations, the connecting portions 105a and 105b can include mechanisms, such as, for example, springs, screws, motors, etc. to adjust the distance between the end-faces 111a and 111b in the free-space medium.

The casings 108a and 108b and the tips 109a and 109b can include materials that are not transparent to light in a wavelength range between about 360 nm and about 3 microns so as to shield the optical components included in the casings 108a and 108b from stray light and/or ambient light such as sunlight. The surfaces of the tips 109a and 109b adjacent the end-faces 111a and 111b can have openings to allow transmission of light between the first and second connecting portions 105a and 105b.

In various implementations, the components in the first and second connecting portions 105a and 105b can be assembled at atmospheric pressure and then deployed in high pressure environments (e.g., at a depth between 100-10,000 feet underwater). The optical components included in the first and second connecting portions 105a and 105b are configured to operate at ambient pressure. Accordingly, the casings 108a and 108b, the material of the optical windows 111a and 111b can be configured to withstand sufficient pressure such that they can be deployed up to a depth of 10,000 feet under the surface of water without damage to the casings 108a and 108b or the optical components included in the casings 108a and 108b.

Various implementations of the fiber-optic connector assembly 100 can be configured such that the external portions of the first and second connecting portions 105a and 105b can be connected to each other while maintaining the portions between the end-faces 111a and 111b at ambient pressure. Accordingly, the design and manufacturing of the first and second connecting portions 105a and 105b can be simplified and the first and second connecting portions can be connected with ease. In various implementations, one or more magnets can be disposed in the tips 109a and 109b to connect the first and second connecting portions 105a and 105b of the fiber-optic cables 101a and 101b. In some implementations, the tips 109a and 109b can include physical locking mechanisms, such as, for example, clips, hooks, screws, grooves, nubs, spring loaded structures, etc. to secure the connection between the first and the second connecting portions 105a and 105b. As discussed above, the mechanisms used to physically connect the first and the second connecting portions 105a and 105b need not be configured to maintain the pressure between the end-faces 111a and 111b at atmospheric pressure. Furthermore, the mechanisms used to physically connect the first and the second connecting portions 105a and 105b are configured to block stray ambient light and/or sunlight from interfering or disrupting the free-space optical link between the first and the second connecting portions 105a and 105b.

In various implementations, the mechanisms used to physically connect the first and the second connecting portions 105a and 105b can be configured such that the first and the second connecting portions 105a and 105b can be easily connected by automated systems (e.g., remotely operated vehicles, robotic arms, etc.). For example, when the first and the second connecting portions 105a and 105b include magnets, automated systems can be used to bring the first and second fiber-optic cables 101a and 101b within a distance of each other such that the first and the second connecting portions 105a and 105b are self-guided towards each other under the influence of attractive magnetic forces and are physically connected to each other. In such implementations, the magnets can be oriented such that they maintain the first and the second connecting portions 105a and 105b in the correct orientation. In some implementations, the first and the second connecting portions 105a and 105b can be physically keyed such that they are connected in the correct orientation. However as discussed, it may not be required to maintain a specific orientation between the first and the second connecting portions 105a and 105b either during connection or after the first and the second connecting portions 105a and 105b. For example, in various implementations, the first connecting portion 105a or the second connection portion 105b may be rotated with respect to the other such that the components of the first connecting portion 105a and the components of the second connecting portion 105b are not displaced along a common axis when connected.

As discussed above, the first and the second connecting portions 105a and 105b are connected to provide a light-tight but not a pressure-tight connection. Thus, the first and the second connecting portions 105a and 105b are connected such that the free space medium between the end-faces 111a and 111b are maintained at ambient pressure. Furthermore, it is not required to displace or remove the free-space medium in the space between the end-faces 111a and 111b prior to and/or while connecting the first and second connecting portions 105a and 105b. Accordingly, when the first and second connecting portions 105a and 105b are connected, the free-space medium between the end-faces 111a and 111b is retained and can be freely exchanged with the surrounding. For example, in implementations of the fiber-optic connector assembly 100 used to connect fiber-optic cables 101a and 101b underwater, the first and the second connecting portions 105a and 105b are connected such that water between the end-faces 111a and 111b is freely exchanged with water in the surrounding areas. Thus, there is a possibility that microorganisms, plants, algae, or animals can accumulate on wetted surfaces of the end-faces 111a and 111b, casing 108a and 108b and/or the tips 109a and 109b. In order to prevent the accumulation of microorganisms, plants, algae, or animals, the surfaces of the end-faces 111a and 111b, casing 108a and 108b and/or the tips 109a and 109b can be coated with an anti-biologic material, such as, for example, biocides (e.g., tributyltin moiety (TBT), copper compounds) and/or non-toxic coatings (e.g., silicone coatings, PDMS coatings, etc.).

Figure 1C:
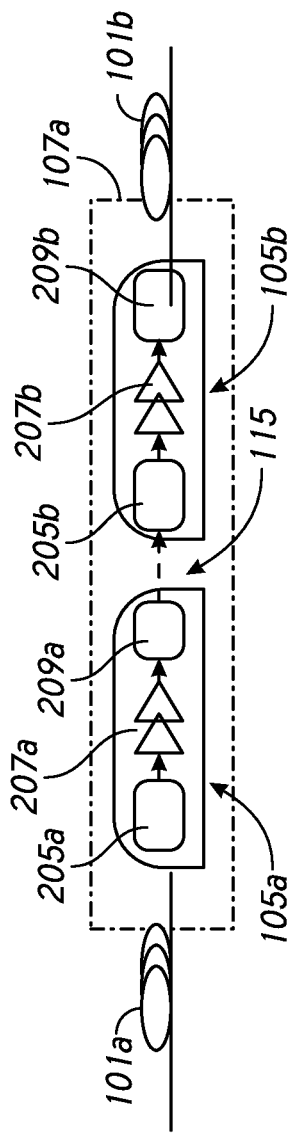
FIG. 1C is a side-view of an implementation of a unidirectional optical communication link included in an implementation of a fiber-optic connector assembly.

FIG. 1C schematically illustrates an implementation of a unidirectional communication link 107a that can be included in an implementation of a fiber-optic connector assembly (e.g., fiber-optic connector assembly 100). In the illustrated implementation, optical components included in the link 107a are configured to transmit optical signals from fiber-optic cable 101a to fiber-optic cable 101b. The first connecting portion 105a includes fiber-optic receiver 205a configured to receive an incoming optical signal at a fiber communication wavelength (e.g., between about 1300 nm and about 1650 nm) from the fiber-optic cable 101a, a signal conditioner 207a connected to the output of the fiber-optic receiver 205a and configured to condition the signal at the output of the receiver 205a and a free-space optical transmitter 209a connected to the output of the signal conditioner 207a and configured to transmit the conditioned signal at a free-space communication wavelength (e.g., between about 360 nm and about 3 micron) through a free-space (e.g. air, water, dirt, smoke, some other liquid, occluded medium, etc.) medium 115 to the second connecting portion 105b. Without any loss of generality, the conditioned signal at a free-space communication wavelength can be emitted out of the first connecting portion 105a generally along a direction parallel to the longitudinal axis 150a.

The fiber-optic receiver 205a includes a photodiode that is sensitive to optical radiation in the wavelength range between about 1300 nm and about 1650 nm. For example, the photodiode can include semiconductor materials, such as, for example, silicon, GaAsP, GaAs, InGaAsP, InP, GaN, etc. In various implementations, the fiber-optic receiver 205a can include one or more optical filters disposed at the input of the photodiode to improve the signal to noise ratio of the incoming optical signal at the fiber communication wavelength. In various implementations, the optical receiver 205a can comprise various electronic components (e.g., amplifiers, filters, demultiplexers, splitters, etc.) at the output of the photodiode. One or more of the electronic components at the output of the photodiode can be useful to recover the incoming data from the optical fiber 101a. In various implementations, the fiber-optic receiver 205a can include components that are configured to receive and recover GigE signals. However, in other implementations, the fiber-optic receiver 205a can be configured to receive and recover data in a wide variety of formats and protocols.

The signal conditioner 207a is connected to the output of the fiber-optic receiver 205a and can condition the signal at the output of the receiver 205a. In various implementations, the signal conditioner 207a can condition the signal at the output of the fiber-optic receiver 205a by amplifying, amplifying and reshaping or by amplifying, reshaping and retiming the recovered data. The various operations performed by the signal conditioner 207a can be useful to recover and regenerate the electrical data from the optical signal at the fiber communication. Various implementations of the signal conditioner 207a can include some or all of the following electronic components that can be useful to recovering and regenerate the electrical data—electrical amplifiers (e.g., RF amplifiers), electrical filters (e.g., band-pass filters having a bandwidth selected less than or equal to the data rate), signal generators, clock recovery circuits, phase locked loops, etc. In various implementations, the signal conditioner 207a can include an electronic repeater. In various implementations, the signal conditioner 207a can include components that are configured to regenerate and/or retime GigE signals. However, in other implementations, the signal conditioner 207a can be configured to regenerate data in a wide variety of formats and protocols.

The free-space optical transmitter 209a includes an optical source (e.g., a semiconductor laser, an organic laser diode, a vertical-cavity surface emitting laser (VCSEL), etc.) that produces an optical carrier at a free-space wavelength in the wavelength range between 360 nm and about 3 micron. In various implementations, the optical source of the free-space optical transmitter 209a can be directly modulated with the electrical data recovered and regenerated by the optical receiver 205a and the signal conditioner 207a to generate an optical data signal at a free-space wavelength in the wavelength range between 360 nm and about 3 micron. Alternately, in some implementations, the free-space optical transmitter 209a can include an optical modulator that is configured to modulate the optical carrier output from the optical source with the electrical data recovered and regenerated by the fiber-optic receiver 205a and the signal conditioner 207a to generate an optical data signal at a free-space wavelength in the wavelength range between 360 nm and about 3 micron.

The free-space optical data signal can be configured to be eye safe for humans and/or birds and animals. For example, in various implementations the optical data signal can have peak or average optical power and/or wavelength that is eye safe for humans and/or birds and animals. In some implementations, devices that detect blocking of the free-space optical data signal and change the optical power, wavelength or other parameters of the free-space optical data signal can be provided to render the free-space optical data signal eye safe for humans and/or birds and animals. Other methods of making the free-space optical data signal eye safe for humans and/or birds and animals can also be used. The free-space optical transmitter 209a can include one or more optical components (e.g., lenses, polarizers, filters, amplifiers, collimating elements, focusing elements, beam shaping elements, etc.) to condition the optical data signal at a free-space wavelength in the wavelength range between 360 nm and about 3 microns such that it can be transmitted through the free-space medium 115, as discussed in detail below with reference to FIGS. 2, 3A and 3B. In various implementations, the free-space optical transmitter 209a can include components that are configured to transmit GigE signals. However, in other implementations, the free-space optical transmitter 209a can be configured to transmit data in a wide variety of formats and protocols. As discussed above, the conditioned signal at the free-space communication wavelength can be emitted generally along a direction parallel to the longitudinal axis 150a.

The second connecting portion 105b includes a free-space optical receiver 205b configured to receive the optical data signal at a free-space wavelength in the wavelength range between 360 nm and about 3 microns transmitted from the free-space optical transmitter 209a over the free-space medium 115, a signal conditioner 207b that conditions (e.g., amplifies, regenerates and/or retimes) the output of the optical receiver 205b and fiber-optic transmitter 209b that injects the conditioned signal at the output of the signal conditioner 207b at a fiber communication wavelength (e.g., between about 1300 nm and about 1650 nm) into the optical fiber 101b.

The free-space optical receiver 205b includes a photodiode that is sensitive to optical radiation in the wavelength range between about 360 nm and about 3 microns. For example, the photodiode can include semiconductor materials, such as, for example, silicon, GaAsP, InGaAsP, InP, GaN, etc. In various implementations, the free-space optical receiver 205b can include one or more optical filters disposed at the input of the photodiode to improve the signal to noise ratio of the incoming optical signal at the free-space wavelength. In various implementations, the free-space optical receiver 205b can include one or more optical components (e.g., lenses, polarizers, filters, amplifiers, collimating elements, focusing elements, beam shaping elements, etc.) at the input of the photodiode to receive an optical data signal transmitted through the free-space medium 115 via the free-space optical link.

In various implementations, the free-space optical receiver 205b can comprise various electronic components (e.g., amplifiers, filters, demultiplexers, splitters, etc.) at the output of the photodiode. One or more of the electronic components at the output of the photodiode can be useful to recover the data transmitted through the free-space medium 115. In various implementations, the free-space optical receiver 205b can include components that are configured to receive and recover GigE signals. In various implementations, the free-space optical receiver 205b can be configured such that the optical data signal transmitted through the free-space medium 115 can be incident on the free-space optical receiver 205b along a direction that is generally parallel to the longitudinal axis 150b or along a direction that is at an angle with respect to the longitudinal axis 150b in a plane orthogonal to the plane containing the longitudinal axis 150b.

Figure 2A:
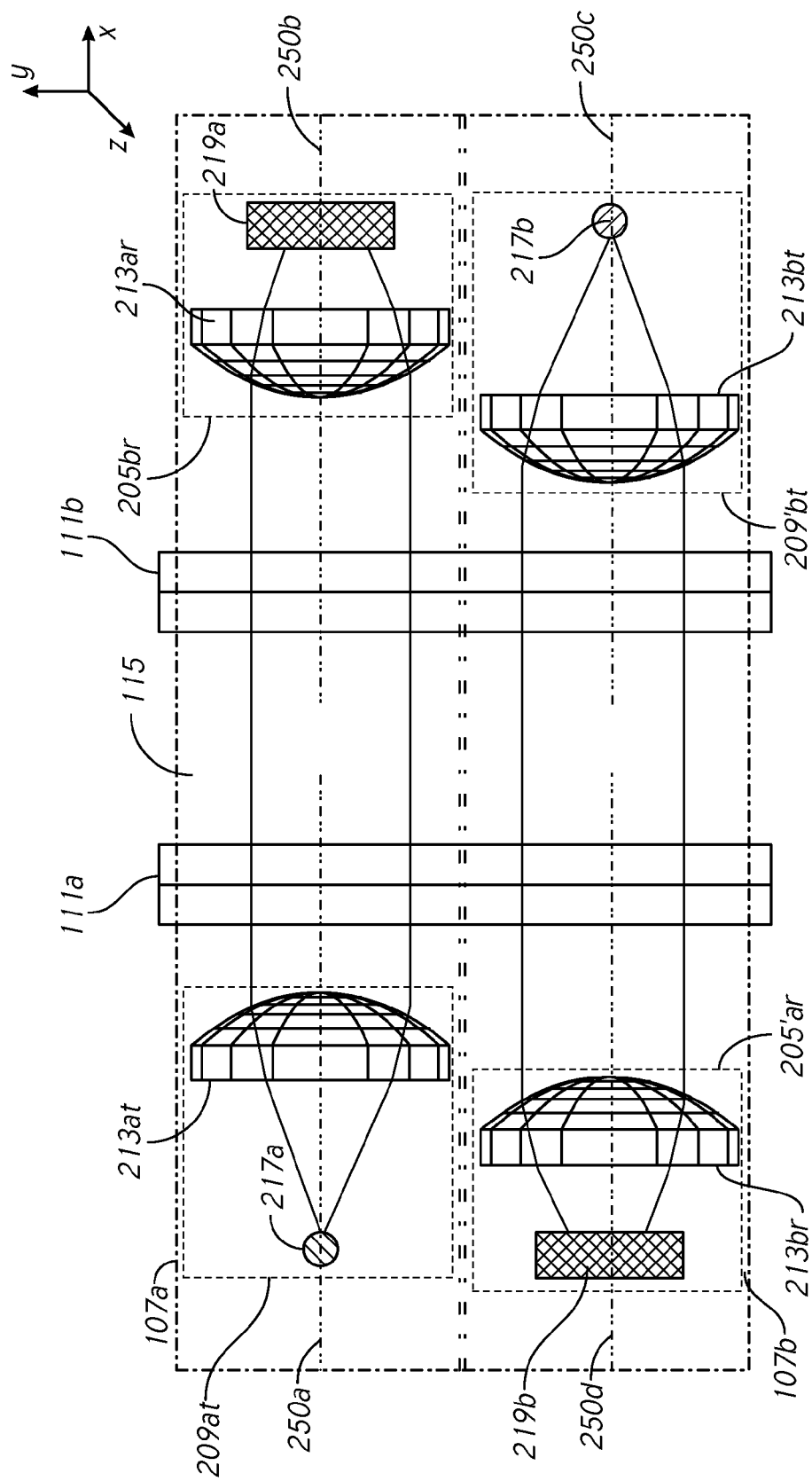
FIG. 2A is a side-view illustrating the components of the free-space optical communication link that form a portion of the bi-directional communication link illustrated in FIG. 1D.

For example, referring to FIG. 2A, the longitudinal axis 250b extends along the x-axis and the optical data signal transmitted through the free-space medium 115 can be incident on the free-space optical receiver 205br along a direction that is at any angle with respect to the longitudinal axis 250b in the x-z plane or the y-z plane. For example, the angle can be between ±5 degrees. In other implementations, the optical data signal transmitted through the free-space medium 115 can be incident on the free-space optical receiver 205br along a direction that is at an angle between ±15 degrees, ±30 degrees, ±45 degrees, ±60 degrees, ±75 degrees, ±90 degrees, ±105 degrees, ±120 degrees, ±135 degrees, ±150 degrees or ±180 degrees with respect to the longitudinal axis 250b in the x-z plane or the y-z plane. Accordingly, in various implementations described herein the first and the second connecting portions 105a and 105b can be tilted with respect to each other by an angle between about ±180 degrees while still having the ability to receive and recover the free-space optical data signal with an error-rate less than $10^{-9}$. For example, depending on the characteristic of the free-space medium including but not limited to turbidity or particulate density, the first connecting portion 105a can be disposed adjacent the second connecting portion 105b thereby forming an angle of ±180 degrees such that optical data signal transmitted from the first connecting portion 105a is scattered by the free-space medium and incident on the free-space optical receiver 205b with sufficient intensity to be recovered with an error-rate less than $10^{-9}$.

With continued reference to FIG. 1C, the signal conditioner 207b is connected to the output of the free-space optical receiver 205b and can condition the signal at the output of the free-space optical receiver 205b. In various implementations, the signal conditioner 207b can condition the signal at the output of the free-space optical receiver 205b by amplifying, amplifying and reshaping or by amplifying, reshaping and retiming the recovered data. The various operations performed by the signal conditioner 207b can be useful to recover and regenerate the electrical data from the optical signal at the fiber communication. Various implementations of the signal conditioner 207b can include some or all of the following electronic components that can be useful to recovering and regenerate the electrical data—electrical amplifiers (e.g., RF amplifiers), electrical filters (e.g., band-pass filters having a bandwidth selected less than or equal to the data rate), signal generators, clock recovery circuits, phase locked loops, etc. In various implementations, the signal conditioner 207b can include an electronic repeater. In various implementations, the signal conditioner 207b can include components that are configured to regenerate and/or retime GigE signals. However, in other implementations, the signal conditioner 207b can be configured to regenerate data in a wide variety of formats and protocols.

The fiber-optic transmitter 209b is connected to the signal conditioner 207b and includes an optical source (e.g., a semiconductor laser, an organic laser diode, a vertical-cavity surface emitting laser (VCSEL), etc.) that produces an optical carrier at a fiber communication wavelength in the wavelength range between 1300 nm and about 1650 nm. In various implementations, the optical source of the fiber-optic transmitter 209b can be directly modulated with the electrical data recovered and regenerated by the free-space optical receiver 205b and the signal conditioner 207b to generate an optical data signal at a fiber communication wavelength in the wavelength range between 1300 nm and about 1650 nm.

Alternately, in some implementations, the fiber-optic transmitter 209b can include an optical modulator that is configured to modulate the optical carrier output from the optical source with the electrical data recovered and regenerated by the optical receiver 205b and the signal conditioner 207b to generate an optical data signal at a fiber communication wavelength in the wavelength range between 1300 nm and about 1650 nm. The fiber-optic transmitter 209b can include one or more optical components (e.g., polarizers, filters, amplifiers, etc.) to condition the optical data signal at the fiber communication wavelength in the wavelength range between 1300 nm and about 1650 nm such that it can be transmitted through the optical fiber 101b. In various implementations, the fiber-optic transmitter 209b can include components that are configured to transmit GigE signals. However, in other implementations, the fiber-optic transmitter 209b can be configured to transmit data in a wide variety of formats and protocols.

Various optical and electronic components of the fiber-optic receiver 205a, the signal conditioner 207a and 207b, free-space optical transmitter 209a, the free-space optical receiver 205b and the fiber-optic transmitter 209b, such as, for example, optical sources, optical receivers, optical and electrical amplifiers, etc. can be powered by a power cable bundled with the fiber-optic cable 101a and fiber-optic cable 101b. Alternately, a battery could be included in the first and/or second connecting portions 105a and 105b to power the various optical and electronic components of the fiber-optic receiver 205a, the signal conditioner 207a and 207b, free-space optical transmitter 209a, the free-space optical receiver 205b and the fiber-optic transmitter 209b.

In various implementations, the fiber-optic receiver 205a, the signal conditioner 207a and the free-space optical transmitter 209a of the first connecting portion 105a can be disposed along the longitudinal axis 150a. Alternately, in some implementations, the fiber-optic receiver 205a, the signal conditioner 207a and the free-space optical transmitter 209a of the first connecting portion 105a can be disposed off-axis such that they are displaced from the longitudinal axis 150a. Similarly, the free-space optical receiver 205b, the signal conditioner 207b and the fiber-optic transmitter 209b of the second connecting portion 205b can be disposed along the longitudinal axis 150b or displaced from the longitudinal axis 150b. Whether, the components of the first and second connecting portions 105a and 105b are disposed on the longitudinal axis 150a and 150b or displaced from the longitudinal axis 150a and 150b, the free-space optical data signal transmitted from the first connecting portion 105a can be scattered by the free-space medium and made incident on the free-space optical receiver 205b with sufficient intensity such that data can be recovered with an error-rate less than $10^{-9}$. This property allows the first and the second connecting portions 105a and 105b to be connected without requiring a specific orientation. Accordingly, the first and the second connecting portions 105a and 105b can be rotated during connection or can rotate when connected without sacrificing receiver sensitivity or incurring a loss of signal.

Figure 1D:
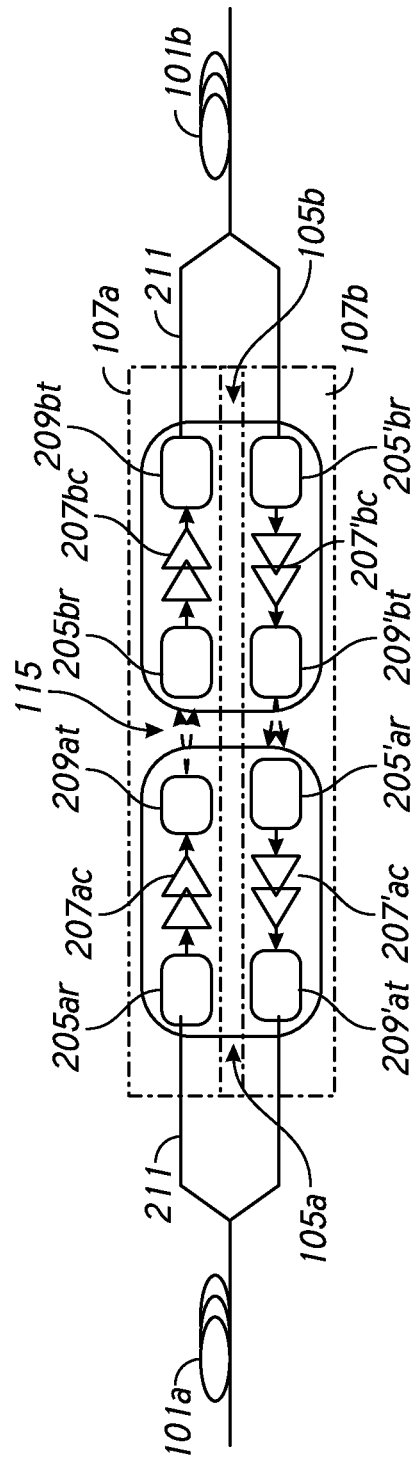
FIG. 1D is a side-view of an implementation of a bi-directional optical communication link included in an implementation of a fiber-optic connector assembly.

FIG. 1D illustrates an implementation of a bidirectional communication link 107a and 107b included in an implementation of a fiber-optic connector assembly (e.g., fiber-optic connector assembly 100). The communication link 107a is configured to transmit optical signals from fiber-optic cable 101a to fiber-optic cable 101b while the optical communication link 107b is configured to transmit optical signals from fiber-optic cable 101b to fiber-optic cable 101a. Accordingly, the first connecting portions 105a and the second connecting portion 105b each include two branches. The first branch forms a portion of the communication link 107a and the second branch from a portion of the communication link 107b.

As discussed above, the first branch of the first connecting portion 105a includes a fiber-optic receiver 205ar configured to receive an incoming optical signal at a first fiber communication wavelength (e.g., between about 1300 nm and about 1650 nm) from the fiber-optic cable 101a, a signal conditioner 207ac configured to condition the signal at the output of the fiber-optic receiver 205ar and a free-space optical transmitter 209at configured to transmit the conditioned signal at a first free-space communication wavelength (e.g., between about 360 nm and about 3 microns) through the free-space medium 115 (e.g. air, water, dirt, smoke, some other liquid, occluded medium, etc.) to the second connecting portion 105b generally along a direction parallel to the longitudinal axis 150a. The free-space optical data signal transmitted from the free-space optical transmitter 209at can be configured to be eye safe for humans and/or birds and animals as discussed above.

The first branch of the second connecting portion 105b includes free-space optical receiver 205br configured to receive the optical data signal at the first free-space wavelength in the wavelength range between 360 nm and about 3 microns transmitted from the free-space optical transmitter 209a over the free-space medium 115, a signal conditioner 207bc that conditions (e.g., amplifies, regenerates and/or retimes) the output of the free-space optical receiver 205br and a fiber-optic transmitter 209bt that injects the conditioned signal at the output of the signal conditioner 207bc at a second fiber communication wavelength (e.g., between about 1300 nm and about 1650 nm) into the optical fiber 101b.

The second branch of the second connecting portion 105b includes a fiber-optic receiver 205'br configured to receive an incoming optical signal at a third fiber communication wavelength (e.g., between about 1300 nm and about 1650 nm) from the fiber-optic cable 101b, a signal conditioner 207'bc configured to condition the signal at the output of the fiber-optic receiver 205'br and a free-space optical transmitter 209'bt configured to transmit the conditioned signal at a second free-space communication wavelength (e.g., between about 360 nm and about 3 microns) through the free-space medium 115 (e.g. air, water, dirt, smoke, some other liquid, occluded medium, etc.) generally along a direction parallel to the longitudinal axis 150b to the first connecting portion 105a. The free-space optical data signal transmitted from the free-space optical transmitter 209'bt can be configured to be eye safe for humans and/or birds and animals as discussed above.

The second branch of the first connecting portion 105a includes a free-space optical receiver 205'ar configured to receive the optical data signal at the second free-space wavelength in the wavelength range between 360 nm and about 3 microns transmitted from the free-space optical transmitter 209'bt over the free-space medium 115, a signal conditioner 207'ac that conditions (e.g., amplifies, regenerates and/or retimes) the output of the free-space optical receiver 205'ar and a fiber-optic transmitter 209'at that injects the conditioned signal at the output of the signal conditioner 207'ac at a fourth fiber communication wavelength (e.g., between about 1300 nm and about 1650 nm) into the optical fiber 101a. Although, in the implementation illustrated in FIG. 1D, only two communication links 107a and 107b are shown, other implementations can include a plurality of communication links operating at a plurality of different wavelengths. For example, in various implementations, four, eight, sixteen, thirty two different communication links each operating at a plurality of wavelengths can be provided.

In various implementations, each of the first, second, third and fourth fiber communication wavelengths can be different. In some implementations, the first and the second fiber communication wavelengths can be equal and have a value that is different from the third and/or the fourth fiber communication wavelengths. Similarly, in some implementations, the third and the fourth fiber communication wavelengths can be equal and have a value that is different from the first and/or the second fiber communication wavelengths.

In various implementations, the first and the second free-space wavelengths can be different from each other. Alternately, in various implementations, the first and the second free-space wavelengths can be the same.

In various implementations, the connecting portions 105a and 105b can include optical components 211 that are configured to direct optical signals from the fiber-optic cables 101a and 101b into the first and/or the second communication links 107a and 107b. The optical components 211 can also be configured to direct optical signals from the first and/or the second communication links 107a and 107b into the fiber-optic cables 101a and 101b. The optical components 211 can include all or some of the following components: wavelength demultiplexers, wavelength multiplexers, optical splitters, optical couplers, optical switches, optical filters, etc.

Although in FIG. 1D, the free-space optical receiver 205br is illustrated as being coaxial with the free-space optical transmitter 209at, they can be axially displaced from each other. As discussed above, since the free-space optical data signal transmitted from the free-space optical transmitter 209at can be scattered by the free-space medium 115 and made incident on the free-space optical receiver 205br with sufficient intensity such that data can be recovered with an error-rate less than $10^{-9}$, whether the free-space optical transmitter 209at is coaxial with the free-space optical receiver 205br or not will not affect the performance of the free-space optical receiver 205br. For the same reason, the free-space optical receiver 205'ar can be coaxial with the free-space optical transmitter 209'bt or axially displaced from the free-space optical transmitter 209'bt.

Figure 1E:
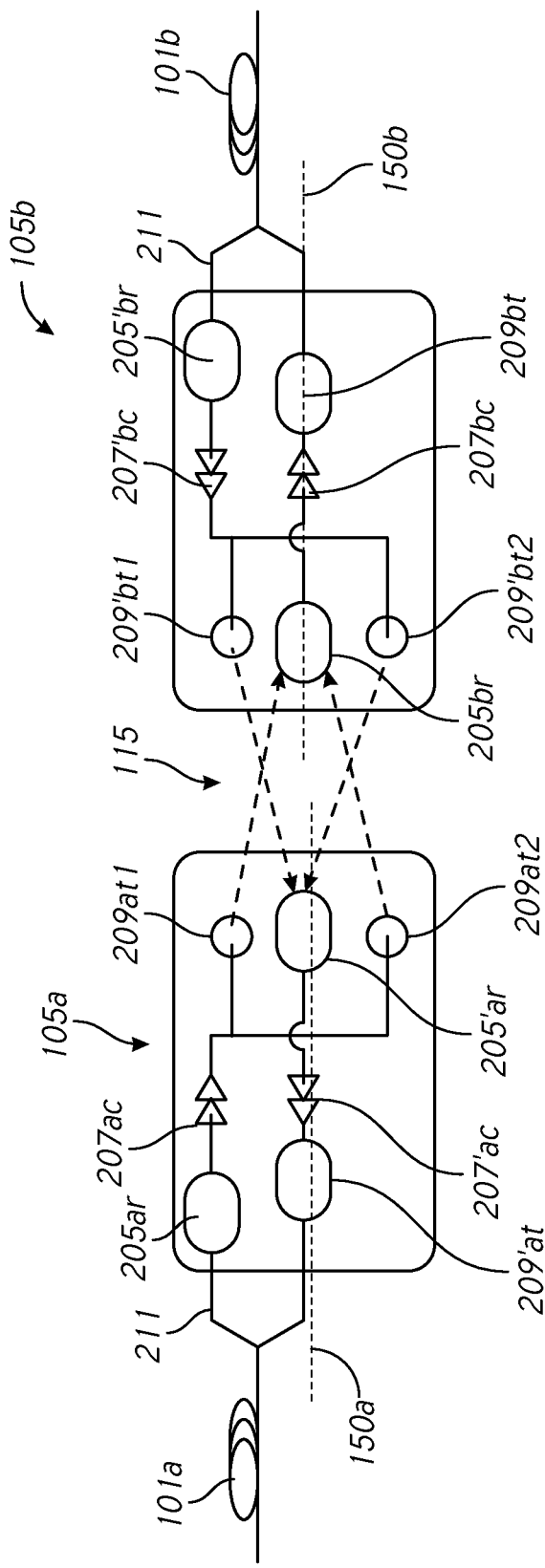
FIG. 1E is a side-view of another implementation of a bi-directional optical communication link included in an implementation of a fiber-optic connector assembly.

FIG. 1E is a side-view of another implementation of a bi-directional optical communication link included in an implementation of a fiber-optic connector assembly. The transmitting portion of the first communication link to transmit data from the fiber-optic cable 101a to the fiber-optic cable 101b includes a fiber-optic receiver 205ar configured to receive an incoming optical signal at a first fiber communication wavelength between about 1300 nm and about 1650 nm from the fiber-optic cable 101a, a signal conditioner 207ac configured to condition the signal at the output of the fiber-optic receiver 205ar and a plurality of free-space optical transmitters 209at1 and 209at2 both operating at a first free-space wavelength between about 360 nm and about 3 microns. The output of the signal conditioner 207ac simultaneously drives the plurality of free-space optical transmitters 209at1 and 209at2 such that two modulated optical beams are transmitted from the first connecting portion 105a through the free-space medium 115 towards the second connecting portion 105b.

The receiving portion of the first communication link includes free-space optical receiver 205br configured to receive the optical data signal at the first free-space wavelength in the wavelength range between 360 nm and about 3 microns transmitted from the plurality of free-space optical transmitters 209at1 and 209at2 over the free-space medium 115, a signal conditioner 207bc that conditions (e.g., amplifies, regenerates and/or retimes) the output of the free-space optical receiver 205br and a fiber-optic transmitter 209bt that injects the conditioned signal at the output of the signal conditioner 207bc at a second fiber communication wavelength (e.g., between about 1300 nm and about 1650 nm) into the optical fiber 101b.

The transmitting portion of the second communication link to transmit data from the fiber-optic cable 101b to the fiber-optic cable 101a includes a fiber-optic receiver 205'br configured to receive an incoming optical signal at a third fiber communication wavelength between about 1300 nm and about 1650 nm from the fiber-optic cable 101b, a signal conditioner 207'bc configured to condition the signal at the output of the fiber-optic receiver 205'br and a plurality of free-space optical transmitters 209'bt1 and 209'bt2 both operating at a second free-space wavelength between about 360 nm and about 3 microns. The output of the signal conditioner 207'bc simultaneously drives the plurality of free-space optical transmitters 209'bt1 and 209'bt2 such that two modulated optical beams are transmitted from the second connecting portion 105b through the free-space medium 115 towards the first connecting portion 105a.

The receiving portion of the second communication link includes free-space optical receiver 205'ar configured to receive the optical data signal at the second free-space wavelength in the wavelength range between 360 nm and about 3 microns transmitted from the plurality of free-space optical transmitters 209'bt1 and 209'bt2 over the free-space medium 115, a signal conditioner 207'ac that conditions (e.g., amplifies, regenerates and/or retimes) the output of the free-space optical receiver 205'ar and a fiber-optic transmitter 209'at that injects the conditioned signal at the output of the signal conditioner 207'ac at a fourth fiber communication wavelength (e.g., between about 1300 nm and about 1650 nm) into the optical fiber 101a.

As discussed above, the first and the second fiber communication wavelengths can be the same. Similarly, the third and the fourth fiber communication wavelengths can also be the same. In various implementations, the first, second, third and fourth fiber communication wavelengths can be different.

The free-space optical receiver 205'ar can be disposed on the longitudinal axis 150a of the first connecting portion 105a as shown in FIG. 1E. In such implementations, the plurality of transmitters 209at1 and 209at2 can be disposed symmetrically about the longitudinal axis 150a. Similarly, the free-space optical receiver 205br can be disposed on the longitudinal axis 150b of the second connecting portion 105b as shown in FIG. 1E. In such implementations, the plurality of transmitters 209'bt1 and 209'bt2 can be disposed symmetrically about the longitudinal axis 150b. Such a configuration can allow the first and second connecting portions to be connected without a specific orientation. For example, the second connecting portion 105b can be rotated with respect to the first connecting portion 105a during connection or when connected without sacrificing receiver sensitivity or incurring a loss of signal.

Although, only a pair free-space optical transmitter 209at1 and 209at2 and 209'bt1 and 209'bt1 are shown in each connecting portion 105a and 105b, various implementations, can include a plurality of free-space optical transmitters 209at1, 209at2, . . . 209atn. For example, in various implementations, four free-space optical transmitters can be provided in each connecting portion. As another example, in various implementations, eight, twelve, sixteen or thirty-two free-space optical transmitters can be provided in each connecting portion.

FIG. 2A illustrates the components of the free-space optical communication link that form a portion of the bi-directional communication links 107a and 107b illustrated in FIG. 1D. As discussed above, the communication link 107a includes a first free-space communication link configured to transmit optical data signal at the first free-space wavelength from the first connecting portion 105a to the second connecting portion 105b through the free-space medium 115. The communication link 107b includes a second free-space communication link configured to transmit optical data signal at the second free-space wavelength from the second connecting portion 105b to the first connecting portion 105a through the free-space medium 115. In various implementations, the free-space medium 115 can be an occluded medium, such as, for example, water having turbidity greater than 5 NTU.

The first free-space communication link includes the first free-space optical transmitter 209at that comprises a first optical source 217a and a beam shaping element 213at and the first free-space optical receiver 205br that comprises a beam shaping element 213ar and a first receiver 219a. The second free-space communication link includes the second free-space optical transmitter 209'bt that comprises a second optical source 217b and a beam shaping element 213bt and a second free-space optical receiver 205'ar that comprises a beam shaping element 213br and a second receiver 219b. The first optical source 217a and the beam shaping element 213a are disposed in the first connecting portion 105a rearward of the optical window 111a and the beam shaping element 213ar and the receiver 219a are disposed in the second connecting portion 105b forward of the optical window 111b. The forward and rearward directions are specified with reference to a direction of propagation of light. Similarly, the first optical source 217b and the beam shaping element 213bt are disposed in the second connecting portion 105a rearward of the optical window 111b and the beam shaping element 213br and the receiver 219b are disposed in the first connecting portion 105b forward of the optical window 111a.

Although in FIG. 2A, the free-space optical receiver 205br is illustrated as being coaxial with the free-space optical transmitter 209at, they can be axially displaced from each other. As discussed above, since the free-space optical data signal transmitted from the free-space optical transmitter 209at can be scattered by the free-space medium 115 and made incident on the free-space optical receiver 205br with sufficient intensity such that data can be recovered with an error-rate less than $10^{-9}$, whether the free-space optical transmitter 209at is coaxial with the free-space optical receiver 205br or not will not affect the performance of the free-space optical receiver 205br. For the same reason, the free-space optical receiver 205'ar can be coaxial with the free-space optical transmitter 209'bt or axially displaced from the free-space optical transmitter 209'bt.

As discussed above, the first and second optical sources 217a and 217b can include a semiconductor laser, an organic laser diode, a vertical-cavity surface emitting laser (VCSEL), or any other source that produces an optical carrier at the first and second free-space wavelengths in the wavelength range between 360 nm and about 3 microns. In various implementations, the optical source 217a can be configured to be directly modulated with the electrical data recovered and regenerated by the optical receiver 205ar and the signal conditioner 207ac to generate an optical data signal at the first free-space wavelength in the wavelength range between 360 nm and about 3 microns. Alternately, in some implementations, an optical modulator can be coupled to the optical source 217a to modulate the optical carrier output from the optical source 217a with the electrical data recovered and regenerated by the optical receiver 205*ar* and the signal conditioner 207*ac* to generate an optical data signal at the first free-space wavelength in the wavelength range between 360 nm and about 3 microns.

Similarly, in various implementations, the optical source 217*b* can be configured to be directly modulated with the electrical data recovered and regenerated by the optical receiver 205'*br* and the signal conditioner 207'*bc* to generate an optical data signal at the second free-space wavelength in the wavelength range between 360 nm and about 3 microns. Alternately, in some implementations, an optical modulator can be coupled to the optical source 217*b* to modulate the optical carrier output from the optical source 217*b* with the electrical data recovered and regenerated by the optical receiver 205'*br* and the signal conditioner 205'*bc* to generate an optical data signal at the second free-space wavelength in the wavelength range between 360 nm and about 3 microns.

The optical source 217*a* and 217*b* can each be disposed at a distance from the corresponding beam shaping element 213*at* and 213*bt*, respectively. For example, in various implementations, the optical source 217*a* can be disposed at distance equal to the focal length of the beam shaping element 213*at* and the optical source 217*b* can be disposed at distance equal to the focal length of the beam shaping element 213*bt*. In various implementations, the optical source 217*a* and 217*b* can be disposed at the focus of the corresponding beam shaping element 213*at* and 213*bt* respectively. In various implementations, the beam shaping elements 213*at* and 213*bt* can include collimating lenses and or diverging lenses. In various implementations, the beam shaping elements 213*at* and 213*bt* can have a diameter between about 2 mm-about 100 mm.

The beam shaping elements 213*at* and 213*bt* can have a size and a shape that is configured to increase the diameter of the light beam output from the optical source 217*a* and 217*b*. For example, in various implementations, the spot size (or the beam diameter) of the beam output from the optical source 217*a* and 217*b* can be less than 1 mm and the beam shaping elements 213*at* and 213*bt* can be configured to increase the spot size of the beam output from the optical source 217*a* and 217*b* such that it is between about 1 mm and about 1 cm. As another example, the beam shaping elements 213*at* and 213*bt* can be configured to increase the spot size of the beam output from the optical source 217*a* and 217*b* such that it is between about 3 mm and about 4 mm. Without any loss of generality, the size of the beam shaping element can be selected based on one or more factors including but not limited to the size of the optical source, the spot size of the beam emitted from the optical source, the desired spot size of the beam transmitted through the free-space medium or the overall dimensions of the connecting portions. The beam shaping elements 213*at* and 213*bt* can each have an optical axis 250*a* and 250*c* respectively.

In various implementations, the optical axes 250*a* and 250*c* can be parallel to the corresponding longitudinal axes 150*a* and 150*b* of the connecting portions 105*a* and 105*b*. In various implementations, the optical windows 111*a* and 111*b* could be configured to provide little to no beam shaping effect. Alternately, in some embodiments, the optical windows 111*a* and 111*b* could be configured to tailor the beam shape and/or size of the beam output from the beam shaping elements 213*at* and 213*bt*. In various implementations, one or more surfaces of the beam shaping elements 213*at*, 213*ar*, 213*bt* and 213*br* could be configured as the optical windows 111*a* and 111*b*.

The beams output from the beam shaping elements 213*at* and 213*bt* can be collimated or diverging and can be emitted along the corresponding optical axis 250*a* and 250*c* (or along a direction parallel to the longitudinal axis 150*a* and 150*b* respectively). In various implementations, additional components such as apertures can be disposed at the input or the output of the beam shaping elements 213*at* and 213*bt* to tailor the beam shape and/or the beam diameter. The output beams from the beam shaping elements 213*at* and 213*bt* transmitted through the free-space medium 115 are incident on the beam shaping elements 213*ar* and 213*br* respectively. The spot size or the diameter of beams output from the beam shaping element 213*at* and 213*bt* can increase as they propagate through the free-space medium 115 due to scattering and/or diffusion. The beam shaping elements 213*ar* and 213*br* can be configured to reduce the spot size or beam diameter of the beam transmitted through the free-space medium 115 such that it can be detected by the receivers 219*a* and 219*b* with sufficient signal-to-noise ratio. For example, in various implementations, the beam shaping elements 213*ar* and 213*br* can be configured to reduce the spot size or beam diameter of the beam transmitted through the free-space medium 115 from about 1 mm-about 1 cm down to a size between about 0.5 mm-about 1 mm. In various implementations, one or more apertures could be disposed forward of the beam shaping elements 213*ar* and 213*br* to tailor the beam size and/or shape. Without any loss of generality, the size of the beam shaping elements 213*ar* and 213*br* can be selected based on one or more factors including but not limited to the size of the receivers 219*a* and 219*b*, the spot size of the beam emitted from the optical source, the desired spot size of the beam incident on the receivers 219*a* and 219*b* or the overall dimensions of the connecting portions.

In various implementations, the beam shaping elements 213*ar* and 213*br* can include one or more focusing elements. The beam shaping elements 213*ar* and 213*br* can each have an optical axis 250*b* and 250*d* respectively. In various implementations, the optical axes 250*b* and 250*d* can be parallel to the corresponding longitudinal axes 150*a* and 150*b* of the connecting portions 105*a* and 105*b*. In various implementations, the connecting portions 105*a* and 105*b* can be connected with each other such that the optical axis 250*b* is aligned with optical axis 250*a* and optical axis 250*c* is aligned with optical axis 250*d*.

The optical receivers 219*a* and 219*b* can be disposed at a distance different from the focal length (e.g., less than or greater than the focal length) of the beam shaping elements 213*ar* and 213*br* such that the optical beams are defocused at the receivers 219*a* and 219*b*. Defocusing the optical beams at the receivers 219*a* and 219*b* can be advantageous because it allows the first and second connecting portions 105*a* and 105*b* to be angled or tilted with respect to each other without sacrificing the ability of the receiver to recover the data with an error rate less than a threshold. Accordingly, the first connecting portion 105*a* can be tilted with respect to the second connecting portion 105*b* by any angle. For example, first connecting portion 105*a* can be tilted with respect to the second connecting portion 105*b* at an angle between about ±5 degrees, ±15 degrees, ±30 degrees, ±45 degrees, ±60 degrees, ±75 degrees, ±90 degrees, ±105 degrees, ±120 degrees, ±135 degrees, ±150 degrees, ±180 degrees or angles there between in a plane orthogonal to the plane containing the longitudinal axis of the connecting portion 105*b* without sacrificing the ability of the receivers 219*a* and 219*b* to receive and recover data with an error rate less than a threshold from the optical data signals transmitted through the free-space medium 115.

Figure 2B:
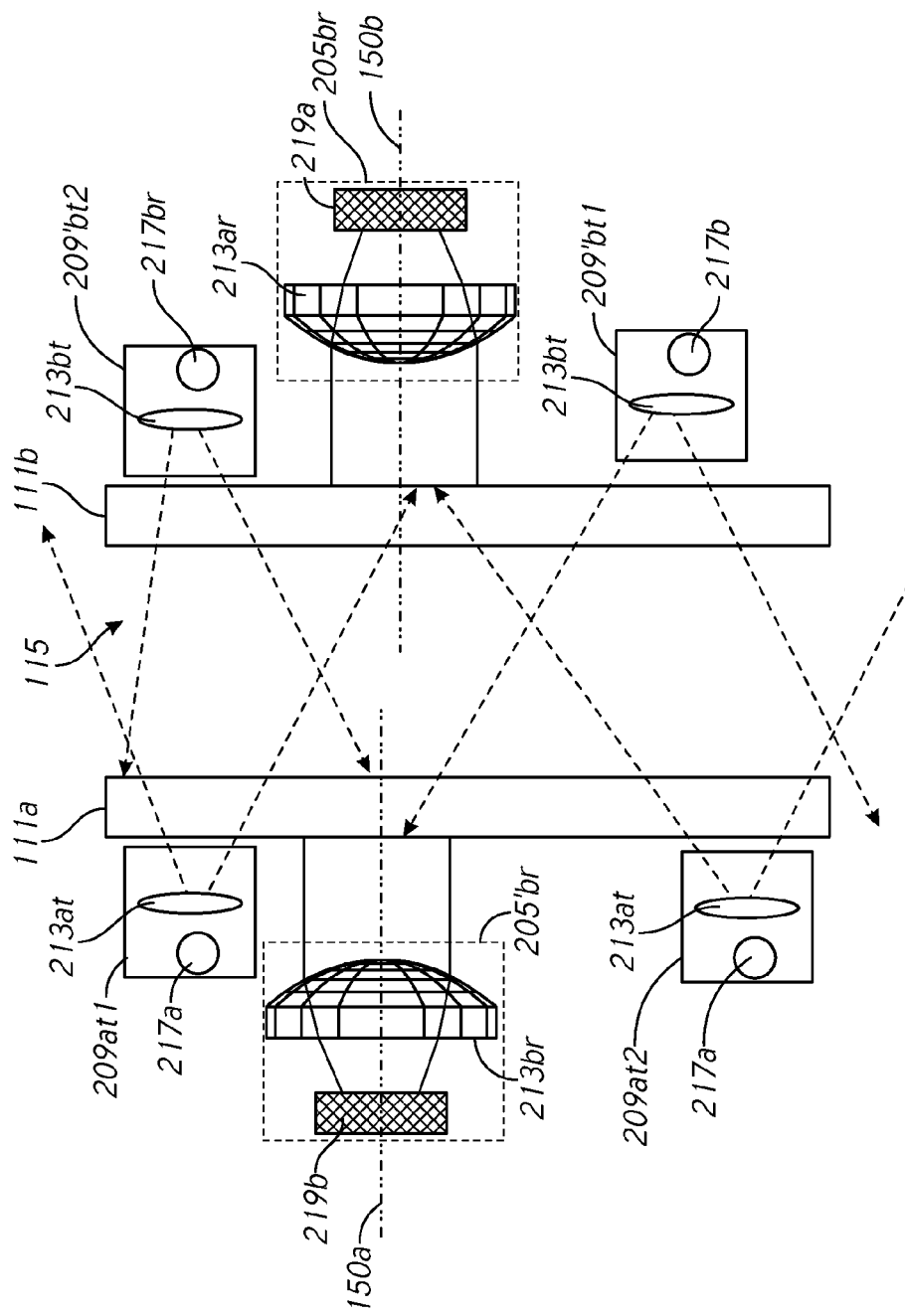
FIG. 2B is a side-view illustrating the components of the free-space optical communication link that form a portion of the bi-directional communication link illustrated in FIG. 1E.

FIG. 2B illustrates the components of the free-space optical communication link that form a portion of the bi-directional communication links illustrated in FIG. 1E. The first connecting portion 105a includes a free-space optical receiver 205'br disposed along the longitudinal axis 150a of the first connecting portion 105a and a plurality of free-space optical transmitters 209at1 and 209at2 disposed on either side of the longitudinal axis 150a and displaced from the longitudinal axis 150a. Each of the plurality of free-space optical transmitters 209at1 and 209at2 comprises an optical source 217a emitting light at a first free-space wavelength λ1 and a beam shaping element 213at.

The second connecting portion 105b includes a free-space optical receiver 205br disposed along the longitudinal axis 150b of the second connecting portion 105b and a plurality of free-space optical transmitters 209'bt1 and 209'bt2 disposed on either side of the longitudinal axis 150b and displaced from the longitudinal axis 150b. Each of the plurality of free-space optical transmitters 209'bt1 and 209'bt2 comprises an optical source 217b emitting light at a second free-space wavelength λ2 and a beam shaping element 213bt.

The free-space optical receiver 205'br is configured to receive the free-space optical signal transmitted at wavelength λ2 from the second connecting portion 105b and the free-space optical receiver 205ar is configured to receive the free-space optical signal transmitted at wavelength λ1 from the second connecting portion 105a.

As discussed above, this configuration of free-space optical transmitters and receivers allows the first and the second connecting portions 105a and 105b to be rotated during connection or when connected without sacrificing receiver sensitivity or suffering a loss of signal.

A free-space optical communication link is usually designed and configured with a small optical power budget wherein the beam transmitted through the free-space medium is launched with just enough optical power to overcome the various optical losses in the free-space optical communication link and be incident on the receiver with a signal strength sufficient to recover the data with an error rate less than a threshold. Accordingly, in such free-space optical communication links, the optical beam transmitted through the free-space medium is focused on the receiver to increase the signal-to-noise ratio of the received signal such that the receiver can recover the transmitted data with an error rate less than a threshold at low optical powers.

In contrast, in the implementations of free-space communication link described herein, the free-space optical signal is launched with an optical power that is between about 10-10,000 times more than the optical power required at the receiver to recover the transmitted data with an error rate less than or equal to $10^{-9}$. Accordingly, the implementations of the free-space communication link described herein have excess optical power budget and thus have sufficient signal strength at the receiver to recover the data with an error rate less than less than or equal to $10^{-9}$ even when defocused.

Figures 3A, 3B:
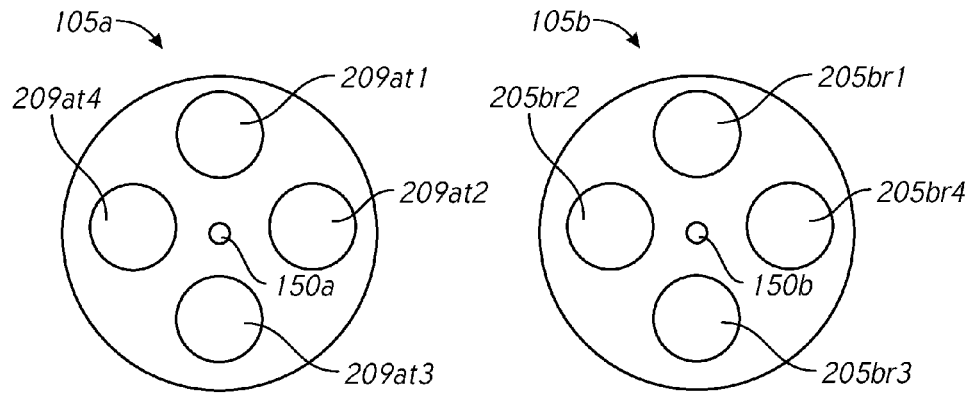
FIGS. 3A-3D illustrated end views of implementations of an optical connector assembly including components configured to provide a plurality of free-space optical links.

FIGS. 3A-3D illustrate end views of implementations of an optical connector assembly including components configured to provide a plurality of free-space optical links. FIGS. 3A and 3B illustrate the cross-sectional views of an implementation of the first connecting portion 105a as seen through the optical window 111a and the second connecting portion 105b as seen through the optical window 111b respectively. The first connecting portion 105a includes a plurality of free-space optical transmitters 209at1-209at4 disposed around the longitudinal axis 150a. Each free-space optical transmitter 209at1-209at4 can include an optical source that is configured to emit radiation at a free-space communication wavelength between about 360 nm and about 3 microns and a beam shaping element as described with reference to FIG. 2. In various implementations, the wavelength of the free-space optical beam emitted by each of the plurality of free-space optical transmitters 209at1-209at4 can be different.

The free-space optical beam emitted by each of the plurality of free-space optical transmitters 209at1-209at4 can be received by a corresponding free-space optical receivers 205ar1-205ar4 disposed in the second connecting portion 105b. Each of the free-space optical receivers 205ar1-205ar4 can include one or more optical filters that are configured to filter out the optical signal transmitted from the associated free-space optical transmitter and reject optical signals from the other free-space optical transmitters. Accordingly, even if the beams output from each of the free-space optical transmitters 209at1-209at4 have a large spot size or beam diameter such that a portion of the optical beams output from the free-space optical transmitters 209at1-209at4 is incident on the unassociated free-space optical receivers 205ar1-205ar4, there would be no cross-talk since the radiation from the unassociated free-space optical transmitters 209at1-209at4 would be rejected by the optical filter.

Figures 3C, 3D:
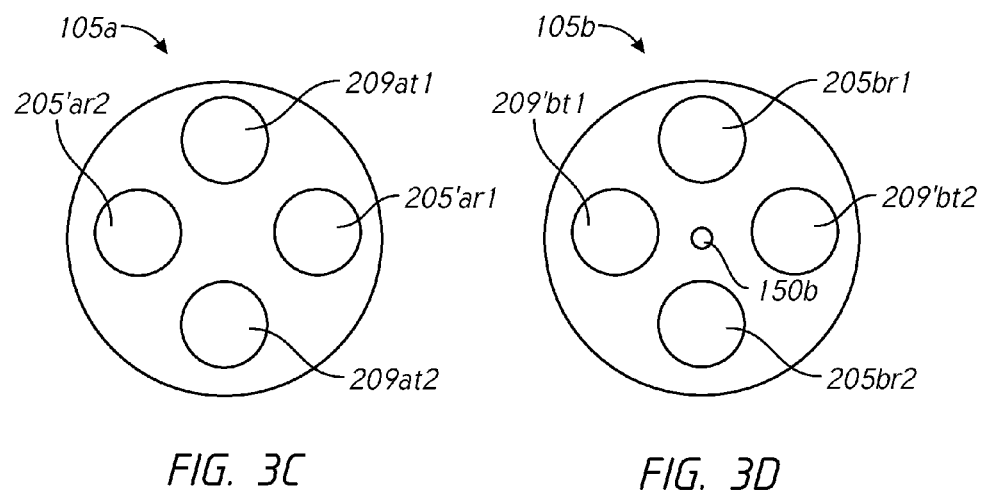

The implementation illustrated in FIGS. 3A and 3B is configured to provide multi-channel unidirectional communication at a plurality of different wavelengths from the first connecting portion 105a to the second connecting portion 105b. The plurality of free-space optical transmitters and free-space optical receivers can also be configured to provide multi-channel bi-directional communication at a plurality of different wavelengths as shown in the implementation illustrated in FIGS. 3C and 3D. For example, the first connecting portion 105a can include a plurality of free-space optical transmitters 209at1 and 209at2 disposed around the longitudinal axis 150a and a plurality of free-space optical receivers 205'ar1 and 205'ar2 disposed around the longitudinal axis 150a, as shown in FIG. 3C.

The second connecting portion 105b includes a free-space optical receiver 205br1 associated with the free-space optical transmitter 209at1 and a free-space optical receiver 205br2 associated with the free-space optical transmitter 209at2. The second connecting portion 105b further includes a free-space optical transmitter 209'bt1 associated with the free-space optical receiver 205'ar1 and a free-space optical transmitter 209'bt2 associated with the free-space optical transmitter 205'ar2. In various implementations, the wavelengths of the optical radiation transmitted from the free-space optical transmitters 209at1 and 209at2 can be different from each other.

In various implementations, the wavelengths of the optical radiation transmitted from the free-space optical transmitters 209'bt1 and 209'bt2 can be different from each other. However, in various implementations, the wavelengths of the optical radiation transmitted from the free-space optical transmitters 209'bt1 and 209'bt2 can be equal to the wavelengths of the optical radiation transmitted from the free-space optical transmitters 209at1 and 209at2.

Figure 3E:
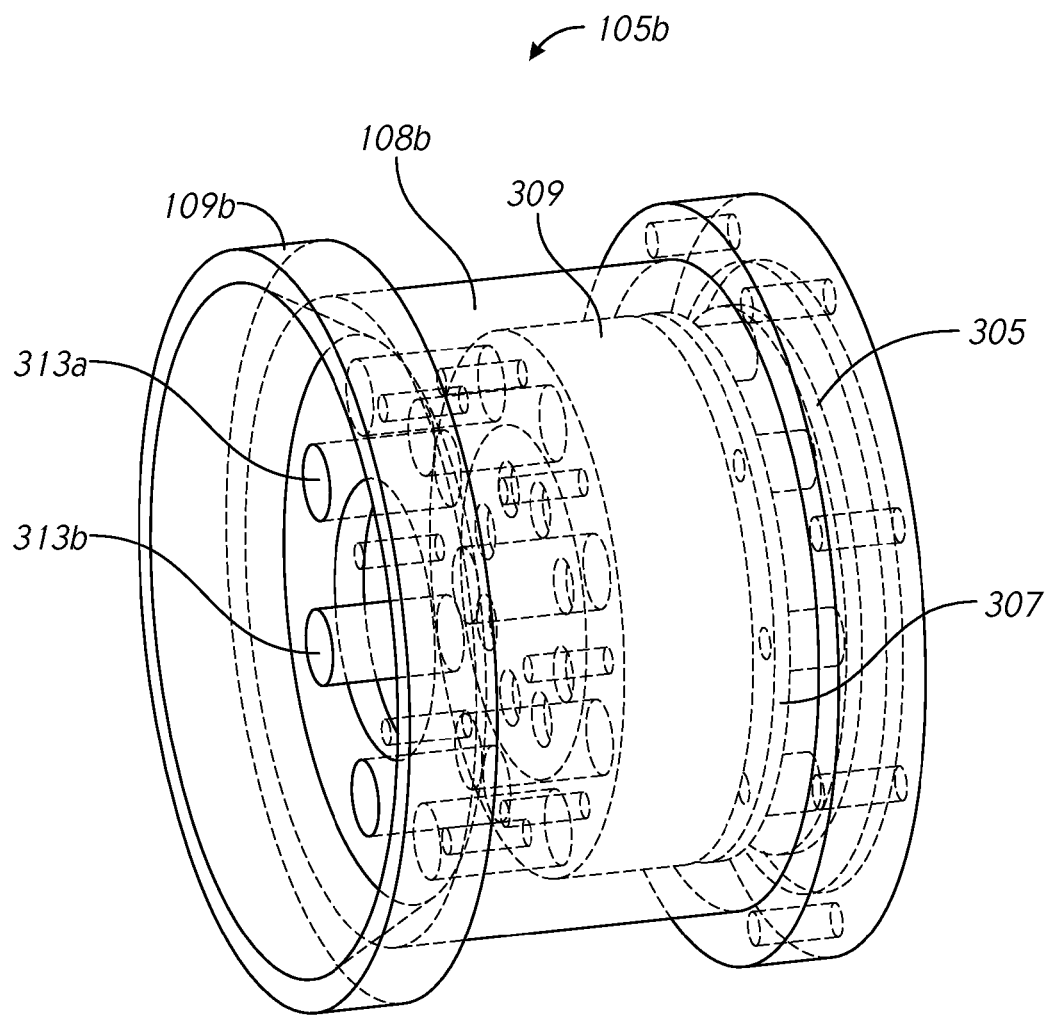
FIG. 3E is a perspective view of an implementation of a connecting portion of an optical connector assembly including components configured to provide a plurality of free-space optical links.

FIG. 3E illustrates an implementation of a second connecting portion 105b that is configured to provide multi-channel free-space communication links. In the illustrated implementation, the second connecting portion 105b includes a mechanical holder 305 configured to hold the plurality of free-space optical sources and/or free-space optical receivers, a printed circuit board 307 including driving circuits to modulate the various free-space optical sources and/or electronic circuits to recover data from the various free-space optical receivers and a holder 309 configured to hold a plurality of beam shaping elements (e.g., 313a and 313b) associated with each of the plurality of free-space optical sources and/or free-space optical receivers. The mechanical holder 305 and the board 307 can include apertures to allow passage of light from the plurality of free-space optical sources and/or to the plurality of free-space optical receivers.

The implementation of the second connecting portion 105b can be configured as a unidirectional multi-channel transmitter or receiver if the mechanical holder 305 includes only a plurality of free-space optical sources or free-space optical receivers. The implementation of the second connecting portion 105b can be configured as a bi-directional multi-channel transceiver if the mechanical holder 305 includes a plurality of free-space optical sources and free-space optical receivers. The connecting portion 105b includes one or more fiber-optic cables disposed on a side opposite the side on which the plurality of beam shaping elements are disposed. The mechanical holder can also include an optical receiver that is configured to receive an optical data signal at a wavelength between about 1300 nm and about 1650 nm from the one or more fiber-optic cables and/or an optical transmitter that is configured to inject an optical data signal at a wavelength between about 1300 nm and about 1650 nm in to the one or more fiber-optic cables. The printed circuit board 307 can include one or more electronic components that are configured to condition the plurality of transmitted or received data signals.

In various implementations, the printed circuit board 307 can also include a power circuit that can receive power from a power cable and/or a battery and provide electrical power to the various optical and electrical components.

In various implementations disclosed herein, the fiber-optic cables 101a and 101b can carry optical time division multiplexed data in which multiple data streams are multiplexed in to a single optical channel. The free-space optical transmitters and receivers can also be configured to transmit and receive one or more beams of light included time division multiplexed data signals through the free-space medium.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In the drawings like numbers are used to represent the same or similar elements wherever possible. The depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The features recited in claims appended to this disclosure are intended to be assessed in light of the disclosure as a whole.

At least some elements of a device of the invention can be controlled—and at least some steps of a method of the invention can be effectuated, in operation—with a programmable processor governed by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A fiber-optic connector assembly comprising:
a first connecting portion, the first connecting portion including:
   a fiber-optic receiver configured to receive an optical signal from an input optical fiber at a fiber communication wavelength between about 1300 nm and about 1650 nm; and
   a free-space optical transmitter configured to transmit a free-space optical signal at a free-space communication wavelength between about 360 nm and about 3 microns through a free space medium, the optical signal modulated with data recovered from the received optical signal; and
a second connecting portion, the second connecting portion including:
   a free-space optical receiver configured to receive at least a portion of the free-space optical signal transmitted from the free-space optical transmitter; and
   a fiber-optic transmitter configured to transmit a fiber-optic signal at a fiber communication wavelength between about 1300 nm and about 1650 nm through an output optical fiber, the fiber-optic signal modulated with data recovered from the portion of the space optical signal received at the free-space optical receiver,
wherein the first and second connecting portions are configured to be physically connected to each other such that when connected, the free-space optical transmitter is spaced apart from the free-space optical receiver by a distance in the free space medium.

2. The fiber-optic connector assembly of claim 1, wherein the distance between the free-space optical transmitter and the free-space optical receiver is between about 1 mm and about 1 m.

3. The fiber-optic connector assembly of claim 1, further comprising a first signal conditioner connected to the fiber-optic receiver and the free-space optical transmitter and configured to condition signal at an output of the fiber-optic receiver.

4. The fiber-optic connector assembly of claim 3, wherein the first signal conditioner is configured to amplify or retime the signal at the output of the fiber-optic receiver.

5. The fiber-optic connector assembly of claim 3, further comprising a second signal conditioner connected to the free-space optical receiver and the fiber-optic transmitter and configured to condition signal at an output of the free-space optical receiver.

6. The fiber-optic connector assembly of claim 1 disposed in an environment having turbidity between about 5 NTU and about 5000 NTU.

7. The fiber-optic connector assembly of claim 1, wherein the first and second connecting portions each comprise a casing.

8. The fiber-optic connector assembly of claim 7, wherein the casing is configured to substantially shield the free-space optical receiver from light emanating from sources other than the free-space optical transmitter.

9. The fiber-optic connector assembly of claim 1, wherein the first and the second connecting portions are configured such that when physically connected the free-space medium included between the free-space optical transmitter and the free-space optical receiver can be exchanged with a medium surrounding the fiber-optic connector assembly.

10. The fiber-optic connector assembly of claim 1, wherein the free-space optical transmitter and the free-space optical receiver each include an optical window that is transmissive to the free-space communication wavelength.

11. The fiber-optic connector assembly of claim 10, wherein the window is coated by an anti-biologic material.

12. The fiber-optic connector assembly of claim 1, wherein the first connecting portion further comprises:
a free-space optical receiver configured to receive an optical signal over the free space medium at a free-space wavelength between about 360 nm and about 3 microns; and
a fiber-optic transmitter configured to transmit the received signal at a fiber communication wavelength between about 1300 nm and about 1650 nm through an output optical fiber.

13. The fiber-optic connector assembly of claim 1, wherein the second connecting portion further comprises:
a fiber-optic receiver configured to receive an optical signal from an input optical fiber at a fiber communication wavelength between about 1300 nm and about 1650 nm; and
a free-space optical transmitter configured to transmit the conditioned signal at a free-space communication wavelength between about 360 nm and about 3 microns through the free space medium.

14. An optical communication system comprising:
a first free-space optical transmitter configured to transmit a first optical signal at a first free-space communication wavelength between about 360 nm and about 3 microns through a free space medium, the first free-space optical transmitter comprising an optical source and a collimating lens configured to collimate light output from the optical source; and
a first free-space optical receiver coupled to the first free-space optical transmitter and spaced apart from the first free-space optical transmitter by a distance less than or equal to about 50 cm in the free space medium, the first free-space optical receiver configured to receive at least a portion of the first free-space optical signal, the first free-space optical receiver comprising an optical detector and a focusing lens having an optical axis and a focal length, the optical detector positioned at a distance less than or greater than the focal length of the focusing lens.

15. The optical communication system of claim 14, wherein the first free-space optical signal is incident on the focusing lens along a direction that is at an angle between about ±30 degrees with respect to the optical axis in a plane orthogonal to a plane including the optical axis.

16. The optical communication system of claim 14, further comprising:
a second free-space optical transmitter configured to transmit a second free-space optical signal at a second free-space communication wavelength between about 360 nm and about 3 microns through the free space medium; and a second free-space optical receiver optically coupled to the second free-space optical transmitter and spaced apart from the second free-space optical transmitter by a distance less than or equal to about 50 cm in the free space medium, the second free-space optical receiver configured to receive at least a portion of the second free-space optical signal.

17. The optical communication system of claim 14, wherein the first free-space optical signal is modulated with data having a data rate less than or equal to about 10 Gb/s.

18. The optical communication system of claim 16, wherein the first free space wavelength is different from the second free-space wavelength.

19. The optical communication system of claim 16 included in a fiber-optic connector assembly, the fiber-optic connector assembly comprising:
 a first connecting portion; and
 a second connecting portion, wherein the first connecting portion includes the first free-space optical transmitter and the second free-space optical transmitter, and wherein the second connecting portion includes the first free-space optical receiver and the second free-space optical receiver.

20. The optical communication system of claim 16 included in a fiber-optic connector assembly, the fiber-optic connector assembly comprising:
 a first connecting portion; and
 a second connecting portion, wherein the first connecting portion includes the first free-space optical transmitter and the second free-space optical receiver, and wherein the second connecting portion includes the first free-space optical receiver and the second free-space optical transmitter.

21. The optical communication system of claim 16 included in a fiber-optic connector assembly, the fiber-optic connector assembly comprising:
 a first connecting portion; and
 a second connecting portion, wherein the first connecting portion is connected to a first fiber-optic cable, and wherein the second connecting portion is connected to a second fiber-optic cable.

22. An optical communication system comprising:
 a first transceiver comprising:
  a first free-space optical receiver configured to receive optical signals at a first wavelength $\lambda 1$; and
  a first plurality of free-space optical transmitters configured to transmit optical signals at a second wavelength $\lambda 2$; and
 a second transceiver configured to receive signals transmitted from the first transceiver and transmit signals to first transceiver, the second transceiver comprising:
  a second free-space optical receiver configured to receive optical signals transmitted from the first plurality of free-space optical transmitters at the second wavelength $\lambda 2$; and
  a second plurality of free-space optical transmitters configured to transmit optical signals at the first wavelength $\lambda 1$ to the first free-space optical receiver,
 wherein the second transceiver is spaced apart from the first transceiver by a distance in a free-space medium.

23. The optical communication system of claim 22, wherein the first free-space optical receiver is disposed about a first longitudinal axis of the first transceiver and the first plurality of free-space optical transmitters are disposed around the first free-space optical receiver.

24. The optical communication system of claim 22, wherein the second free-space optical receiver is disposed about a second longitudinal axis of the second transceiver and the second plurality of free-space optical transmitters are disposed around the second free-space optical receiver.

25. The optical communication system of claim 22, wherein the free-space medium has a turbidity between about 5 NTU and about 5000 NTU.

26. The optical communication system of claim 22, wherein the distance between the first transceiver and the second transceiver is between about 1 mm and 1 m.

27. A method of connecting a first connecting portion and a second connecting portion of a fiber-optic connector assembly, the method comprising:
 bringing the first connecting portion within a distance of the second connecting portion such that the first connecting portion is self-guided under the influence of an attractive force towards the second connecting portion and physically contacts the second connecting portion such that an optical transmitter disposed in the first connecting portion or the second connecting portion is spaced apart from an optical receiver disposed in the second connecting portion or the first connecting portion by a space including a medium.

28. The method of claim 27, wherein the first connecting portion is brought within a distance of the second connecting portion by an automated device.

29. The method of claim 27, wherein the first connecting portion is self-guided towards the second connecting portion under the influence of a magnetic force.

30. The method of claim 27, wherein the medium has a turbidity between about 5 NTU and about 5000 NTU.

* * * * *